(12) United States Patent
Joerg et al.

(10) Patent No.: US 8,214,324 B2
(45) Date of Patent: Jul. 3, 2012

(54) GENERATING EXTRACT, TRANSFORM, AND LOAD (ETL) JOBS FOR LOADING DATA INCREMENTALLY

(75) Inventors: Thomas Joerg, Kaiserslautern (DE); Albert Maier, Tuebingen (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/547,326

(22) Filed: Aug. 25, 2009

(65) Prior Publication Data
US 2011/0055147 A1    Mar. 3, 2011

(51) Int. Cl.
 G06F 7/00 (2006.01)
 G06F 17/00 (2006.01)
(52) U.S. Cl. .................................. 707/602; 707/603
(58) Field of Classification Search .................. None
 See application file for complete search history.

(56) References Cited

U.S. PATENT DOCUMENTS

| | | | |
|---|---|---|---|
| 6,032,158 A | 2/2000 | Mukhopadhyay et al. | |
| 6,604,110 B1 * | 8/2003 | Savage et al. | 707/602 |
| 6,999,977 B1 | 2/2006 | Norcott et al. | |
| 7,058,615 B2 * | 6/2006 | Yao | 706/12 |
| 7,191,183 B1 * | 3/2007 | Goldstein | 707/602 |
| 7,370,033 B1 * | 5/2008 | Roychowdhury | 707/602 |
| 2002/0099563 A1 * | 7/2002 | Adendorff et al. | 705/1 |
| 2004/0044671 A1 * | 3/2004 | Yoshimura et al. | 707/100 |
| 2004/0083199 A1 * | 4/2004 | Govindugari et al. | 707/1 |
| 2004/0215584 A1 * | 10/2004 | Yao | 706/12 |
| 2007/0239508 A1 * | 10/2007 | Fazal et al. | 705/8 |
| 2008/0228697 A1 | 9/2008 | Adya et al. | |
| 2009/0055370 A1 * | 2/2009 | Dagum et al. | 707/4 |
| 2010/0211539 A1 * | 8/2010 | Ho | 707/602 |

OTHER PUBLICATIONS

Zhang, et al. "Generating Incremental ETL Processes Automatically," IEEE Computer Society (2006), pp. 1-6.

* cited by examiner

*Primary Examiner* — Kuen Lu
*Assistant Examiner* — Tuan A Pham
(74) *Attorney, Agent, or Firm* — Patterson & Sheridan, LLP

(57) ABSTRACT

Systems, methods and articles of manufacture are disclosed for generating an incremental ETL job from an instance of an abstract ETL operator model representing an exhaustive ETL job for loading data from a source schema to a target schema. In one embodiment, the abstract operator model may be extended to include incremental variants of operators of the abstract ETL operator model. From the instance of the abstract ETL operator model and from the extended ETL operator model, a corresponding instance of the extended ETL operator model may be generated. An incremental ETL job may be deployed from the instance of the extended ETL operator model. The incremental ETL job may be executed to load data from the source schema to the target schema.

18 Claims, 15 Drawing Sheets

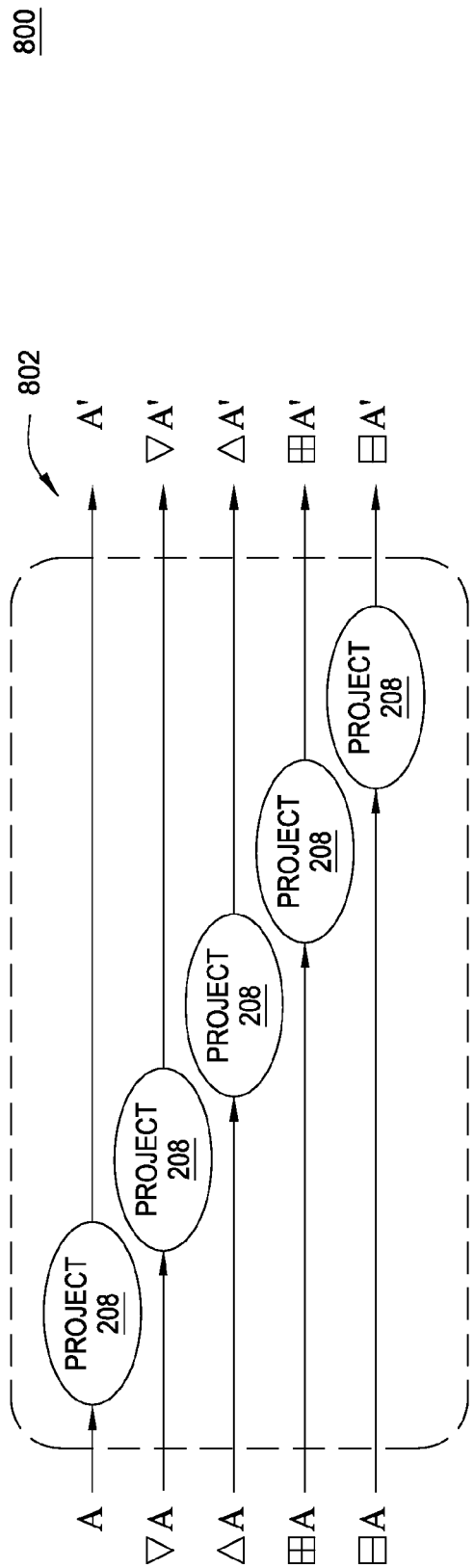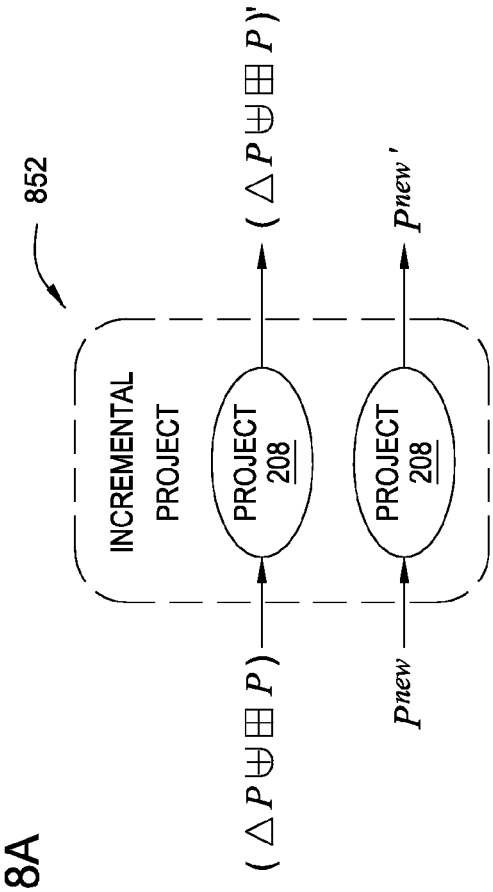
FIG. 8A
FIG. 8B

GENERATING EXTRACT, TRANSFORM, AND LOAD (ETL) JOBS FOR LOADING DATA INCREMENTALLY

BACKGROUND OF THE INVENTION

1. Field of the Invention

Embodiments of the invention provide techniques for generating Extract, Transform, and Load (ETL) jobs. More specifically, embodiments of the invention relate to techniques for generating ETL jobs for loading data incrementally.

2. Description of the Related Art

ETL jobs typically integrate data from multiple, heterogeneous data sources into a central repository such as a data warehouse. Integrated data in the central repository may need to be periodically refreshed to prevent the integrated data from turning stale (due to data being changed at one of the data sources, for example). However, periodically reloading all of the data from the data sources may be unacceptably costly in terms of performance. Instead, the data may be loaded from the data sources incrementally. Incrementally loading data refers to a technique of capturing changes at the data source and propagating the changes to the central repository. For example, an ETL job may infer, from changes captured at the data source, how to update the central repository accordingly. However, it may be costly to have an ETL programmer create each such ETL job for incrementally loading data.

SUMMARY OF THE INVENTION

One embodiment of the invention includes a computer-implemented method. The method may generally include receiving an abstract extract, transform, and load (ETL) operator model. The ETL model may specifies a plurality of operations for extracting, transforming, and loading data stored in one or more source systems into storage by a target system. The method may also include receiving a first instance of an abstract ETL operator model. The first instance of the abstract ETL operator model represents a first ETL job for loading data exhaustively from the one or more source systems to the target system. The method may also include generating, from the first instance, a second instance of the extended ETL operator model. The second instance of the extended ETL operator model may represent a second ETL job. Further, the second ETL job, when executed on a computer processor, an incremental extract, transform, and load of data retrieved from the source systems for storage by the target system.

In a particular embodiment, the method may further include receiving a description how to transform the instance of the abstract ETL operator model into the first ETL job in an ETL layer and generating the first ETL job from the first instance of the abstract ETL operator model. The first ETL job, when executed on the computer processor, performs an exhaustive extract, transform, and load of data retrieved from the source systems for storage by the target system. The method may also include generating the second ETL job from the second instance of the extended ETL operator model that performs the incremental extract, transform, and load of data retrieved from the source systems for storage by the target system.

Another embodiment of the invention includes a computer-readable storage medium containing a program, which, when executed on a processor, performs an operation. The operation itself may generally include receiving an abstract extract, transform, and load (ETL) operator model. The ETL operator model may specify a plurality of operations for extracting, transforming, and loading data stored in one or more source systems into storage by a target system. The operation may further include receiving a first instance of an abstract ETL operator model. The first instance of the abstract ETL operator model represents a first ETL job for loading data exhaustively from the one or more source systems to the target system. The operation may also include generating, from the first instance, a second instance of the extended ETL operator model. The second instance of the extended ETL operator model may represent a second ETL job. Further, the second ETL job, when executed on the computer processor, an incremental extract, transform, and load of data retrieved from the source systems for storage by the target system.

Still another embodiment of the invention provides a system having one or more computer processors and a memory containing a program, which when executed by the processor is configured to perform an operation. The operation itself may generally include receiving an abstract extract, transform, and load (ETL) operator model. The ETL operator model may specify a plurality of operations for extracting, transforming, and loading data stored in one or more source systems into storage by a target system. The operation may further include receiving a first instance of an abstract ETL operator model. The first instance of the abstract ETL operator model represents a first ETL job for loading data exhaustively from the one or more source systems to the target system. The operation may also include generating, from the first instance, a second instance of the extended ETL operator model. The second instance of the extended ETL operator model may represent a second ETL job. Further, the second ETL job, when executed on the computer processors, an incremental extract, transform, and load of data retrieved from the source systems for storage by the target system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 8A-8B illustrate incremental PROJECT operators composed from operators of the abstract ETL operator model, according to one embodiment of the invention.

DETAILED DESCRIPTION OF THE PREFERRED EMBODIMENTS

Figure 1:
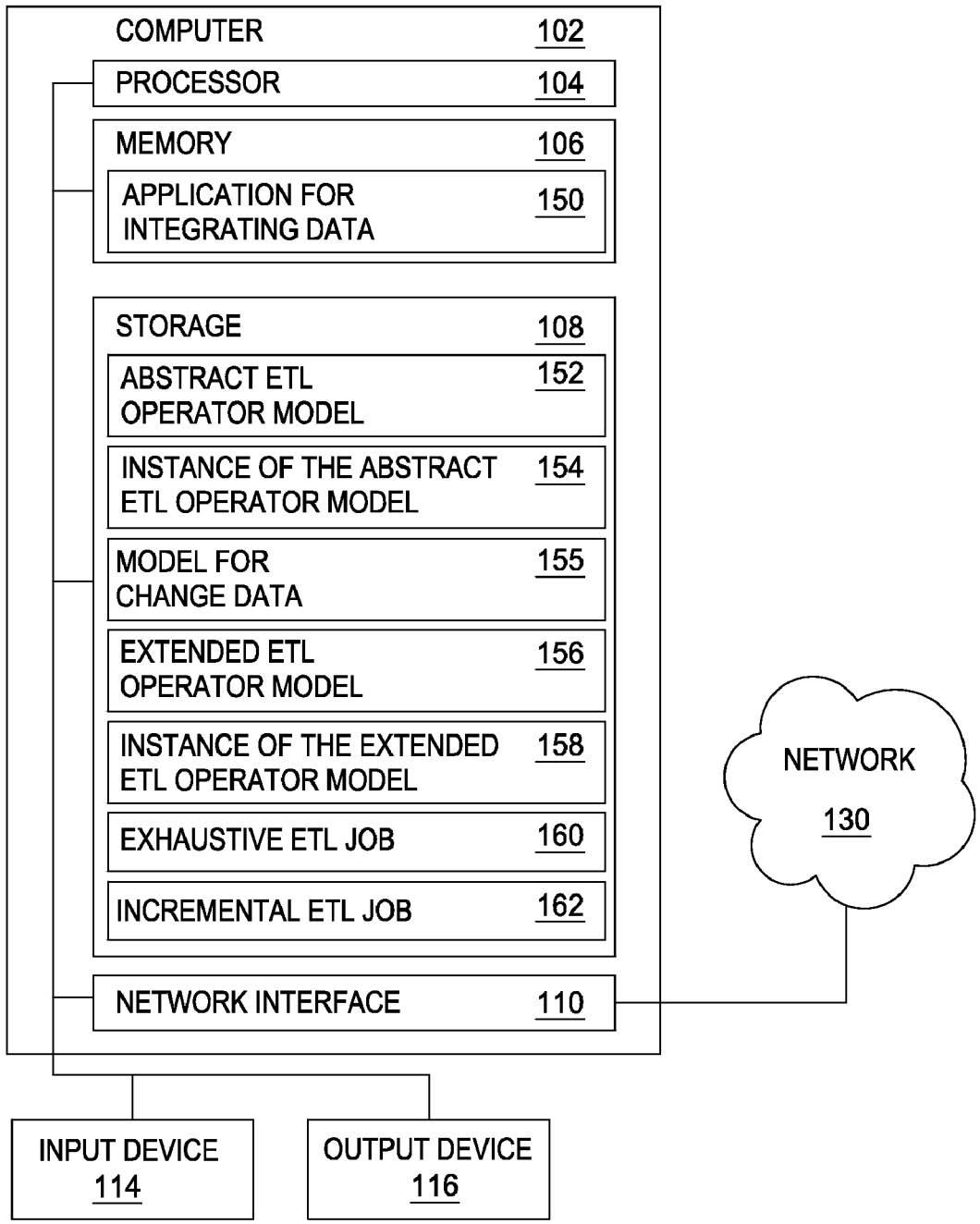
FIG. 1 is a block diagram illustrating a system for generating an ETL job for loading data incrementally from a source system to a target system, according to one embodiment of the invention.

Embodiments of the invention provide techniques for generating ETL jobs for loading data incrementally. One embodiment of the invention extends an abstract ETL operator model. The abstract ETL operator model provides operators such as SPLIT operator, a FILTER operator, a PROJECT operator, and a JOIN operator. The operators are independent of any specific ETL platform. Thus, an exhaustive ETL job may be represented in an ETL-platform-neutral manner using the operators. An exhaustive ETL job refers to an ETL job that loads data from one or more source systems to a target system. An example of an exhaustive ETL job is an initial load from one or more data stores into a data warehouse or a master or a master data management system.

An ETL-platform-neutral representation of an exhaustive ETL job (that is composed using the operators) is referred to herein as an "instance" of the abstract ETL operator model. For example, the instance of the abstract ETL operator model may be a directed acyclic graph, each node of the directed acyclic graph representing an operator or a table. As is known, a directed acyclic graph (or DAG) is a directed graph with no directed cycles.

While sufficient to represent exhaustive ETL jobs, the abstract ETL operator model may nevertheless be insufficient to represent incremental ETL jobs. An incremental ETL job refers to an ETL job that incrementally loads data from one or more source systems to a target system. Accordingly, one embodiment of the invention extends the abstract ETL operator model, thereby providing an extended ETL operator model. The extended ETL operator model may include incremental variants of operators of the abstract ETL operator model. Further, the extended abstract ETL operator model may specify each incremental variant as a composition of operators from the abstract ETL operator model. Examples of operators from the extended abstract ETL operator model include an incremental SPLIT operator, an incremental FILTER operator, an incremental PROJECT operator, and an incremental JOIN operator. An incremental ETL job may be represented in an ETL-platform-neutral manner using the incremental variants. Such an ETL-platform-neutral representation of an incremental ETL job (that is composed using the incremental variants) is referred to herein as an "instance" of the extended ETL operator model. For example, the instance of the extended ETL operator model may be a DAG, each node of the DAG representing an operator or a table. At least one of the operators of the DAG may be an incremental variant.

Further, embodiments of the invention provide a software application for integrating data. The software application may be configured to receive an instance of an abstract ETL model. The instance of the abstract ETL model may represent an ETL job for loading data exhaustively from the source system to the target system (for example, performing an initial load from the source system to the target system). Further, the software application may generate the instance of the abstract ETL model from the ETL job for exhaustively loading data from the source system to the target system. The software application may also generate, from the instance of the abstract ETL model, an ETL job for incrementally loading data from the source system to the target system. Specifically, the software application may transform operators in the instance of the abstract ETL model into incremental variants of the operators according to the extended abstract ETL operator model. The generated ETL job may then be executed to incrementally load data from the source system to the target system. Thus, ETL jobs for incrementally loading data may be generated more efficiently and economically than those manually created by an ETL programmer. Further, generating incremental ETL jobs using the techniques disclosed herein may also apply ETL logic from the exhaustive ETL job to the incremental ETL job more consistently than would manually creating the incremental ETL job.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for generating an ETL job for loading data incrementally from a source system to a target system, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 for integrating data. That is, the application 150 may generally be configured to integrate data from one or more source systems to a target system. For example, the application 150 may integrate data from one or more data stores to a data warehouse. Alternatively, the application 150 may integrate data from one or more data stores to a master data management system (MDM). As is known, MDM generally references a set of processes and tools used to consistently define and manage the non-transactional data entities of an organization (also called reference data). MDM provides processes for collecting, aggregating, matching, consolidating, quality-assuring, persisting and distributing such data throughout an organization to ensure consistency and control in the ongoing maintenance and application use of this information.

The storage 108 of the computer 102 includes an abstract ETL operator model 152, an instance 154 of the abstract ETL operator model 152, a model 155 for changed data, an extended ETL operator model 156, an instance 158 of the extended ETL operator model 156, and an ETL job 160 for exhaustively loading data, and an ETL job 162 for incrementally loading data. FIGS. 2 through 15 and associated descriptions detail the structure and operation of the application 150 running on the computer 102.

In one embodiment, the application 150 may provide a software application configured to generate the ETL job 156 for loading data incrementally. For example, the application 150 may extend the abstract ETL operator model 152 to produce an extended ETL operator model 156. The extended ETL operator model 158 may include incremental variants of operators in the abstract ETL operator model 152. An example of an abstract ETL operator model 152 is the Operator Hub Model (OHM) introduced by the Orchid system developed at the Almaden Research Center of International Business Machines Corp. (IBM®) of Armonk, N.Y. Among other things, the Orchid system converts schema mappings into data flows (ETL jobs) and vice versa.

Figure 2:
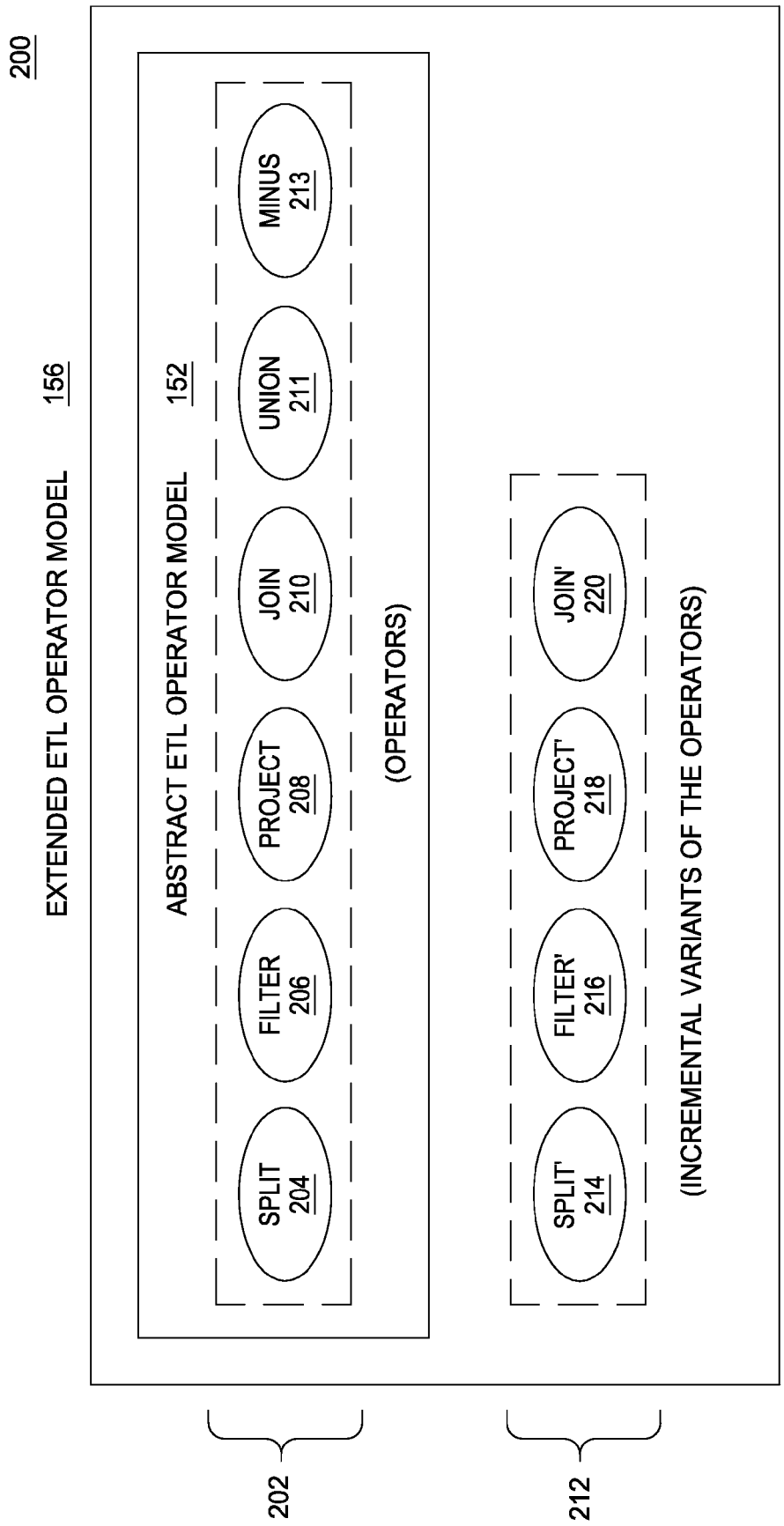
FIG. 2 illustrates an example of an extended ETL operator model, according to one embodiment of the invention.

FIG. 2 illustrates an example 200 of the extended ETL operator model 156 of FIG. 1, according to one embodiment of the invention. As shown, the extended ETL operator model 156 includes operators 202 of the abstract ETL operator model 152. The operators 202 of the abstract ETL operator model 152 load data exhaustively and include a SPLIT operator 204, a FILTER operator 206, a PROJECT operator 208, a JOIN operator 210, a UNION operator 211, and a MINUS operator 213. The SPLIT operator 204 branches a data flow. The FILTER operator 206, the PROJECT operator 208, the JOIN operator 210, the UNION operator 211, and the MINUS operator 213 correspond to relational selection, projection, join, and union, and difference operators, respectively. The extended ETL operator model 156 also includes operators not provided by the abstract ETL operator model 152. These operators include incremental variants 212 of the operators 202 of the abstract ETL operator model 152. The incremental variants 212 include a SPLIT' operator 214, a FILTER' operator 216, a PROJECT' operator 218, and a JOIN' operator 220. Each incremental variant 212 may be defined based on the model 155 for changed data. The operators 202 and the incremental variants 212 of the operators 202 are further described below in conjunction with FIGS. 6 through 15.

Figure 3:
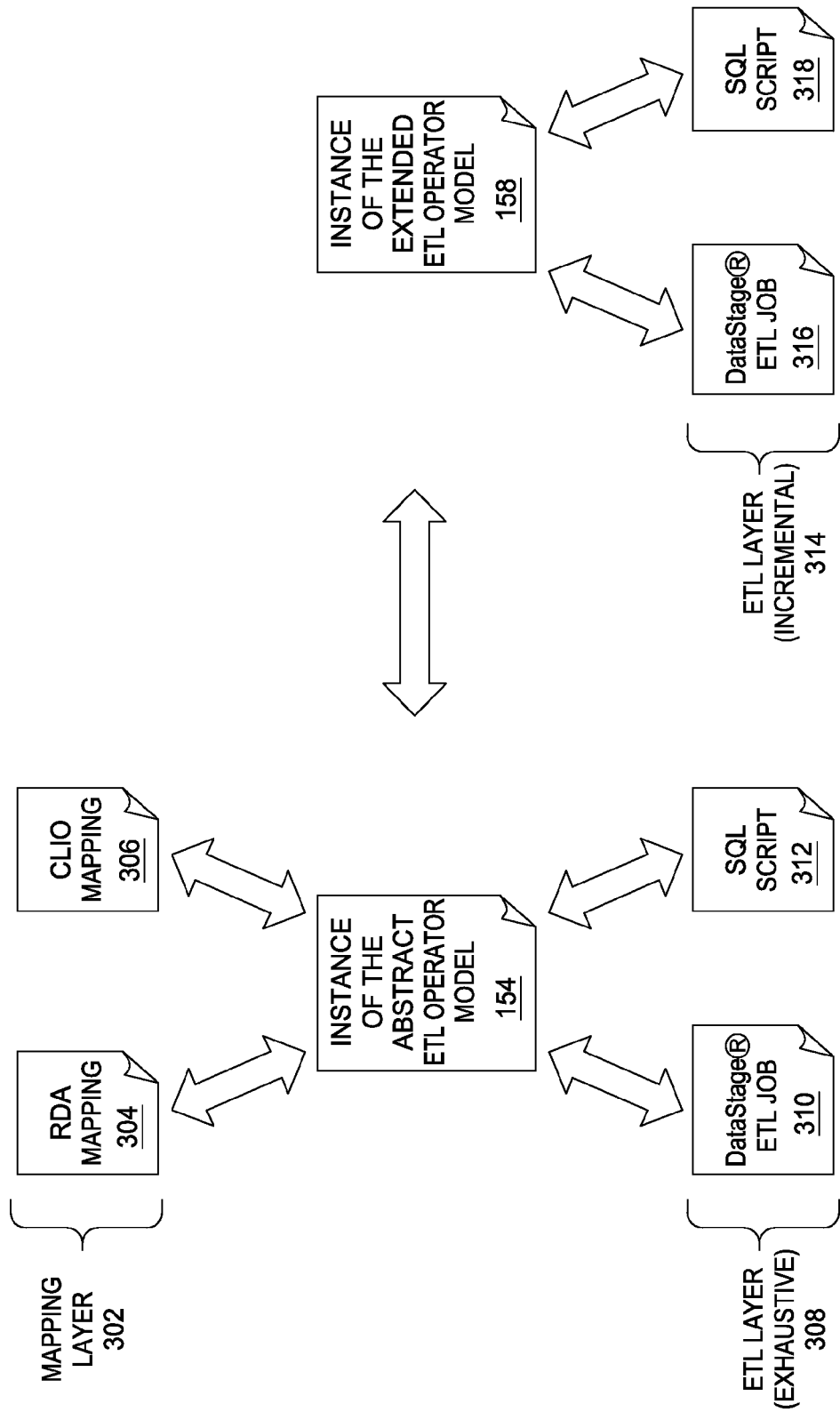
FIG. 3 is a diagram that illustrates translating schema mappings to ETL jobs (and vice versa) via an instance of an abstract ETL operator model, according to one embodiment of the invention.

FIG. 3 is a diagram 300 that illustrates translating schema mappings to ETL jobs (and vice versa) via an instance 154 of the abstract ETL operator model 152 of FIG. 1, according to one embodiment of the invention. The abstract ETL operator model 152 may capture semantics for transforming data that are common to both schema mappings and ETL jobs. The abstract ETL operator model 152 may act as an intermediary for translating schema mappings to ETL jobs (and vice versa). For example, the abstract ETL operator model 152 may transform between a mapping layer 302 (of schema mappings) and an exhaustive ETL layer 308 (of ETL jobs for exhaustively loading data). As shown, the mapping layer 302 includes an IBM® Rational® Data Architect (RDA) mapping 304 and an IBM® Clio mapping 306. RDA is a tool for enterprise data modeling and integration design, while Clio is a system for expressing declarative schema mappings. Further, the exhaustive ETL layer 308 includes an IBM® InfoSphere DataStage® ETL job 310 and a Structured Query Language (SQL) script 312, both of which load data exhaustively from one or more source systems to a target system. DataStage® is an ETL tool, while SQL is a well-known database computer language designed for managing data in relational database management systems (RDBMS).

In one embodiment, the abstract ETL operator model 152 provides operators that are independent of any specific ETL platform and that capture semantics for transforming data that are common to both schema mappings and ETL jobs. Once the abstract ETL operator model 152 is defined, the application 150 may transform a schema mapping or an ETL job (for exhaustively loading data) into the instance 154 of the abstract ETL operator model 152 (and vice versa). The instance 154 of the abstract ETL operator model 152 represents, in terms of operators of the abstract ETL operator model 152, how data is to be exhaustively loaded from one or more source systems to a target system. For example, the instance 154 of the abstract ETL operator model 152 may represent an exhaustive ETL job in a manner independent of any specific ETL platform.

Further, the application 150 may generate an extended ETL operator model 156 to include incremental variants of operators of the abstract ETL operator model 152. The application 150 may transform the instance 154 of the abstract ETL operator model 152 into an instance 158 of the extended ETL operator model 156. The instance 158 of the extended ETL operator model 156 represents, in terms of operators of the extended ETL operator model 156, how data is to be incrementally loaded from the one or more source systems to the target system. The application 150 may then transform the instance 158 of the extended ETL operator model 156 into an ETL job for incrementally loading data (e.g., corresponding to an incremental ETL layer 314 of the FIG. 3). As shown, the incremental ETL layer 314 may include, for example, a DataStage® ETL job 316 and a SQL script 318, both of which load data incrementally from one or more source systems to a target system.

Figure 4:
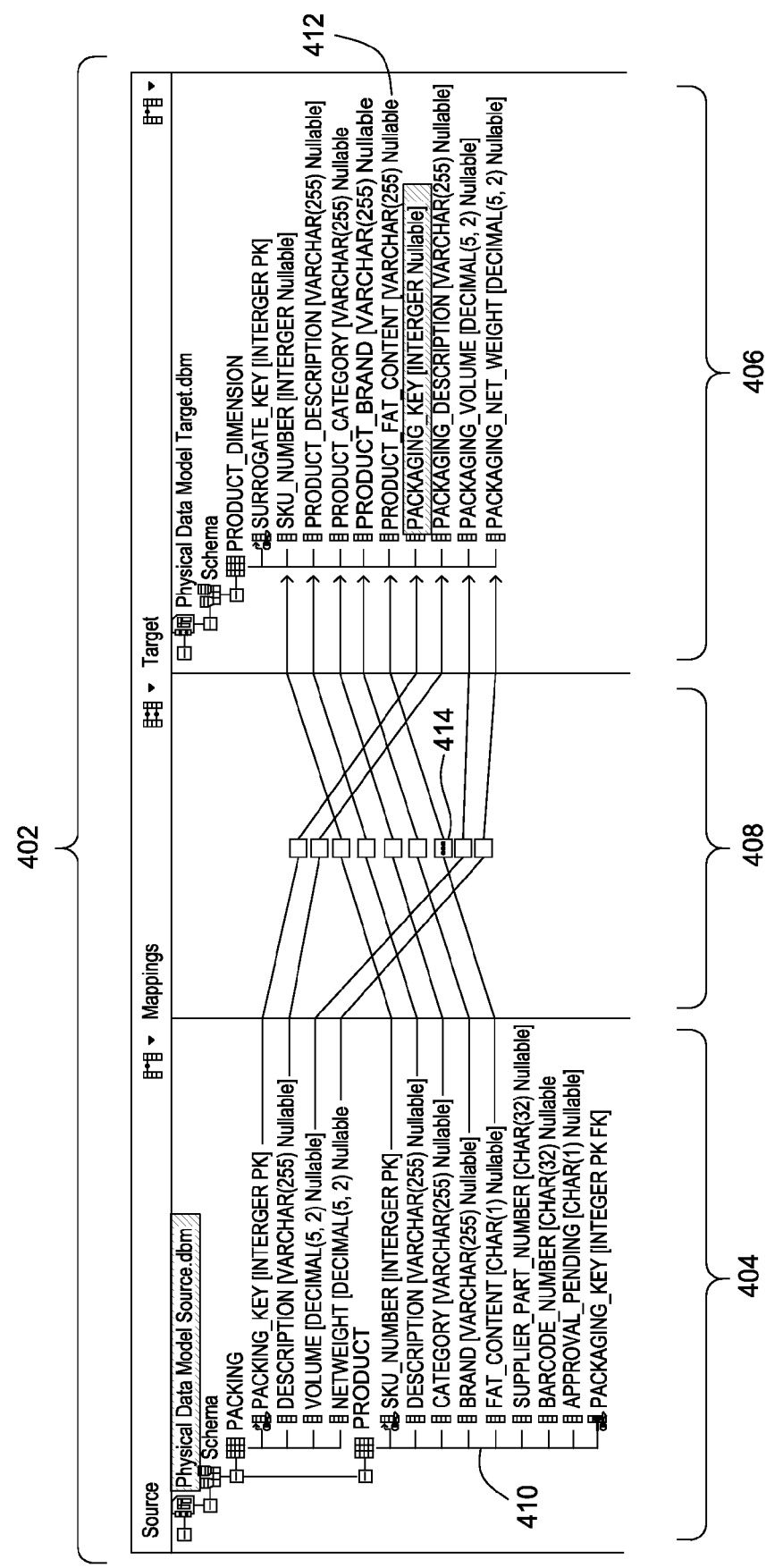
FIG. 4 illustrates an example of a schema mapping, according to one embodiment of the invention.

FIG. 4 illustrates an example of a schema mapping 402, according to one embodiment of the invention. In this particular example, the schema mapping 402 is shown in a GUI screen 400 of a tool for data modeling. In one embodiment, the application 150 may transform a schema mapping into an instance 154 of the abstract ETL operator model 152 (and vice versa). The schema mapping 402 specifies a collection of transformations 408 between a source schema 404 and a target schema 406. In this particular example, the source schema 404 and the target schema 406 store data about products and product packaging. As shown in FIG. 4, arrows map between elements of the source schema 404 and the target schema 406. Further, the mappings may include semantics 414 for transforming between data types used by the source model and the transformed model (represented by node 414). For example, a field 410 labeled PRODUCT.FAT_CONTENT of the source schema 404 is to be converted from type CHAR to type VARCHAR and mapped to a field 412 labeled PRODUCT_DIMENSION.PRODUCT_FAT_CONTENT in the target schema 406. An example of a data transformation is provided below in conjunction with FIG. 5. Further, the schema mapping 402 may also include a filter that specifies conditions. The filter excludes data from the source schema 404 that fail to satisfy the conditions from being loaded into the target schema. An example of filter conditions is provided below in conjunction with FIG. 6.

Figure 5:
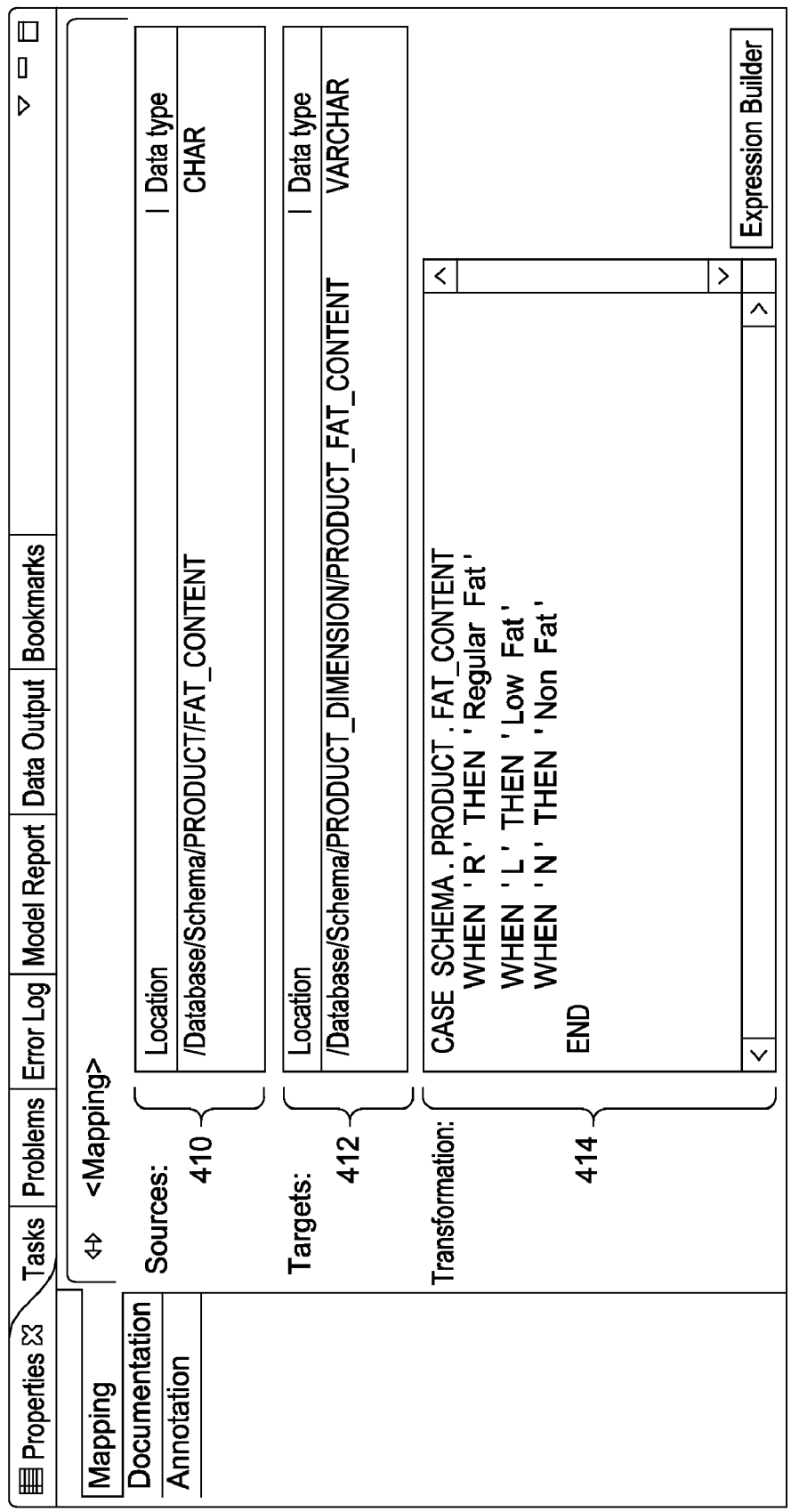
FIG. 5 illustrates an example of semantics for transforming data, according to one embodiment of the invention.

FIG. 5 illustrates an example of the semantics 414 for transforming data, according to one embodiment of the invention. In this particular example, the semantics 414 for transforming data are shown in a GUI screen 500 of a tool for data modeling. As shown, the semantics 414 specify how data is to be transformed when the data is mapped from the field 410 labeled PRODUCT.FAT_CONTENT of the source schema to the field 412 labeled PRODUCT_DIMENSION.PRODUCT_FAT_CONTENT in the target schema. In this particular example, the semantics 414 convert single-character codes to self-explanatory terms. Specifically, the semantics 414 provide as follows:

```
CASE SCHEMA.PRODUCT.FAT_CONTENT
    WHEN 'R' THEN 'Regular Fat'
    WHEN 'L' THEN 'Low Fat'
    WHEN 'N' THEN 'Non Fat'
END
```

As shown, the semantics 414 specify that values of "R" in the field 410 of the source schema are to be converted to values of "Regular Fat" when mapped to the field 412 in the target schema. Similarly, values of "L" are to be converted to values of "Low Fat," and values of "N" are to be converted to values of "Non Fat."

Figure 6:
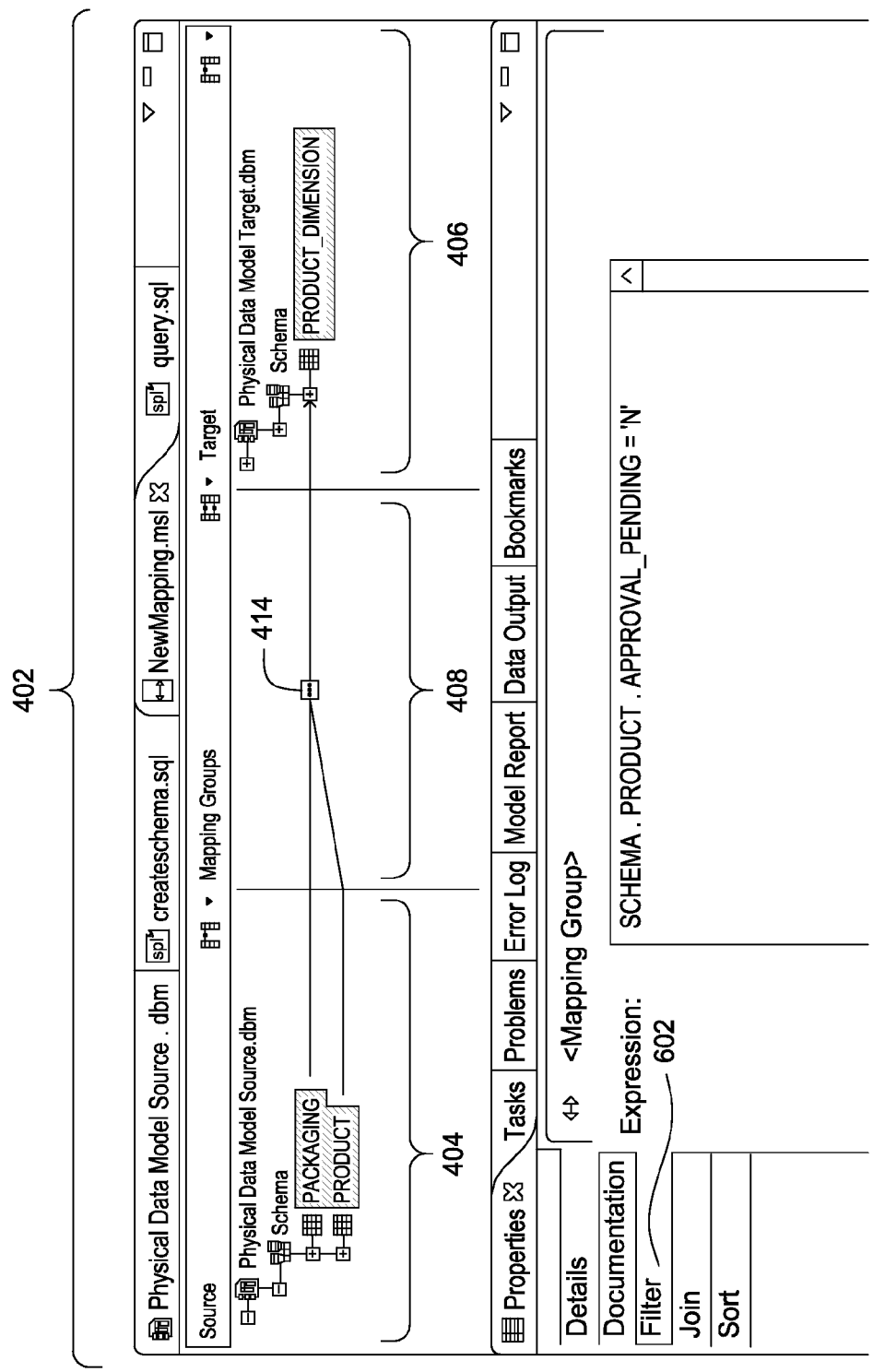
FIG. 6 illustrates an example of a filter for the schema mapping, according to one embodiment of the invention.

FIG. 6 illustrates an example of a filter 602 for the schema mapping 402 of FIG. 4, according to one embodiment of the invention. In this particular example, the filter 602 is shown in a GUI screen 600 of a tool for data modeling. As shown, the filter 602 specifies conditions for mapping data from the source schema 404 to the target schema 406. The filter 602 excludes data from being mapped to the target schema 406. The excluded data may be data from the source schema 404 that does not satisfy a set of conditions. In this particular example, the filter 602 excludes products pending approval from being loaded into the target schema 406. Specifically, the filter 602 specifies SCHEMA.PRODUCT.APPROVAL_PENDING='N'. That is, data from the source schema 404 is to have a value of "N" in an APPROVAL_PENDING field to be loaded into the target schema 406.

Figure 7:
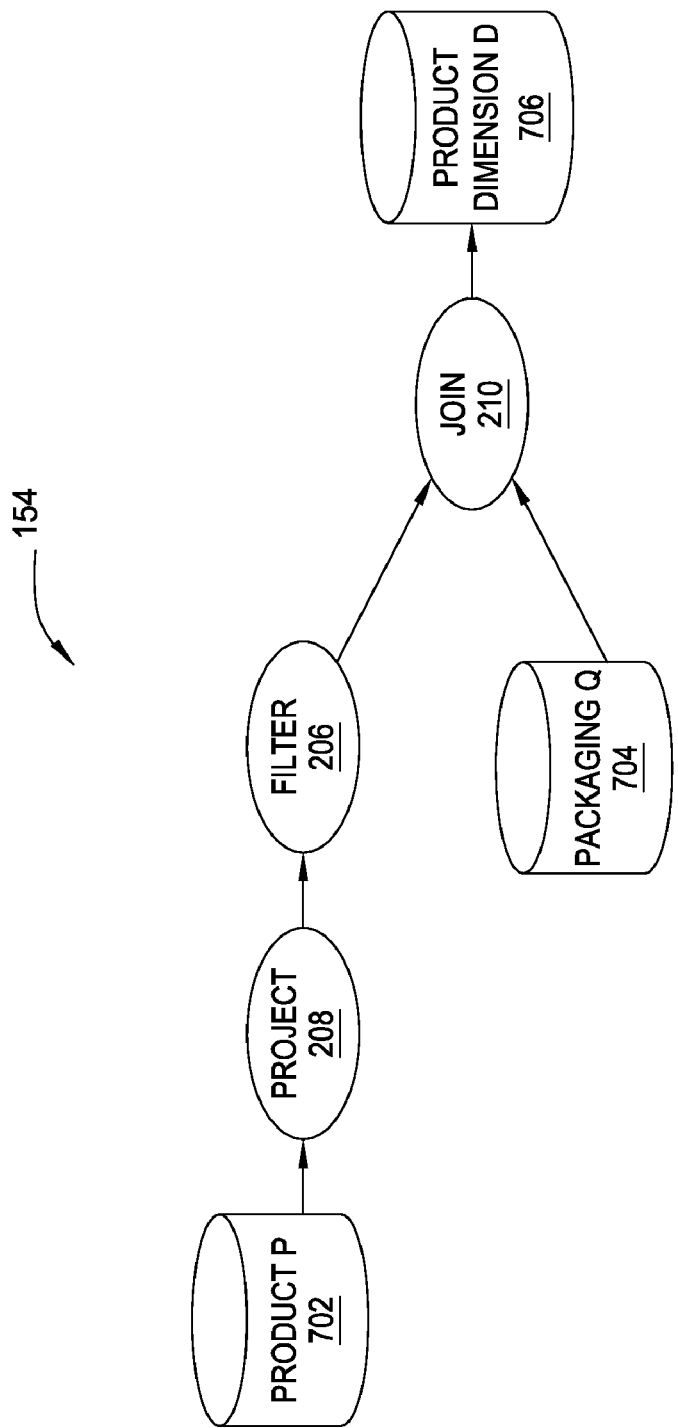
FIG. 7 illustrates a result of converting the schema mapping into the instance of the abstract ETL operator model, according to one embodiment of the invention.

In one embodiment, the application 150 may convert a schema mapping into an instance of the abstract ETL operator model 152. For example, FIG. 7 illustrates a result 700 of converting the schema mapping 402 of FIG. 4 into the instance 154 of the abstract ETL operator model 152, according to one embodiment of the invention. The instance 154 of the abstract ETL operator model 152 is composed from: (i) operators of the abstract ETL operator model 152; (ii) tables of the source schema; and (iii) tables of the target schema, according to one embodiment. In this particular example, the instance 154 of the abstract ETL operator model 152 is represented as a DAG, each node of the DAG representing an operator or a table.

As shown, the instance 154 of the abstract ETL operator model 152 includes the following nodes: a PRODUCT table 702, a PACKAGING table 704, a PRODUCT_DIMENSION table 706, a PROJECT operator 208, a FILTER operator 206, and a JOIN operator. Further, the instance 154 of the abstract ETL operator model 152 includes arrows: from the PRODUCT table 702 to the PROJECT operator 208, from the PROJECT operator 208 to the FILTER operator 206, from the FILTER operator 206 to the JOIN operator 210, from the PACKAGING table 704 to the JOIN operator 210, and from the JOIN operator 210 to the PRODUCT_DIMENSION table 706.

Thus, the abstract ETL operator model 152 may represent an ETL job as follows: the PROJECT operator 208 receives records from the PRODUCT table 702. For example, the PROJECT operator 208 may drop a SUPPLIER_PART_NUMBER field and a BARCODE_NUMBER field. Further, the PROJECT operator 208 may convert values of the FAT_CONTENT field (e.g., from "R" to "Regular Fat"). The PROJECT operator 208 outputs to the FILTER operator 206. The FILTER operator 206 may drop records that do not satisfy a predicate (e.g., SCHEMA.PRODUCT.APPROVAL_PENDING='N'). The FILTER operator 206 outputs to the JOIN operator 210. The JOIN operator 210 combines output from the FILTER operator 206 with records from the PACKAGING table 704. The JOIN operator 210 outputs to the PRODUCT_DIMENSION table 706.

The instance 154 of the abstract ETL operator model 152 specifies how data may be exhaustively loaded from the source schema to the target schema. More specifically, data is extracted from a data source that adheres to the source schema and loaded into the data sink that adheres to the target schema. However, data processing differs between exhaustively loading data and incrementally loading data. An exhaustive load extracts data from the source schema, transforms the data, and loads the data into the target schema. In contrast, an incremental load captures changes of data in the source schema, propagates the changes to the target schema, and updates the target schema incrementally. In one embodiment, the application 150 may provide a model 155 for changed data. The application may use the model 155 to load data incrementally.

In one embodiment, the model 155 for changed data generalizes the relational model for database management. As is known, the relational model for database management is a database model based on first-order predicate logic. The relational model is based on sets (i.e., the relational model disallows duplicate tuples within a single relation). To more adequately describe ETL data flows, however, the model 155 allows duplicate tuples within a single relation. In particular, ETL tools and data integration tools typically do not implicitly eliminate duplicate tuples. Instances of the model 155, referred to herein as datasets, may be defined as follows:

Definition 1—Given sets $S_1, \ldots, S_n$ (not necessarily distinct) of atomic values, a dataset D on these n sets is a multiset of n-tuples each of which has its first element from $S_1$, its second element from $S_2$, and so on. The n-tuple $(S_1, \ldots, S_n)$ is referred to as the schema of D. More formally, D is a pair (D', count) such that:

$$D' \subseteq S_1 \times \ldots \times S_n$$

and $$\text{count: } D' \to N^+$$

where D' is the underlying set of tuples contained in D, where a function, "count," maps each tuple in D' to its multiplicity (i.e., a number of its occurrences in D), and where N stands for the set of natural numbers.

Further, a dataset may refer to entire content of a source schema at a specific point in time. Exhaustive loading extracts such entire content. Incremental loading, however, captures information describing how content of a source schema has changed over time, referred to as "change data." In one embodiment, incremental loading may include capturing "change data," (i.e., identifying changes in an operational data store) propagating the change data, and applying the change data. Change data may be captured at the granularity of a tuple. Each tuple of the change data represents an inserted, deleted, or updated tuple in the operational data store (configured according to the source schema).

The change data may also be defined using multiset operators. The multiset operator include an additive union, denoted by ⊎ ,and a bag difference, denoted by ⊖. Unlike a set union, the additive union adds duplicate elements in multisets. For example, if an element x appears n times in multiset S and m times in multiset T, the number of occurrences of x in S⊎T is (n+m). Further, unlike a set difference, the bag difference subtracts duplicate elements from multisets. For example, the number of occurrences of x in S⊖T is (n−m) if n≧m; otherwise, the number of occurrences is zero. Using these multiset operators, the change data may be formally defined as follows:

Definition 2—Given a dataset $D^{new}$ of schema S that represents the current content of a data source and a dataset $D^{old}$ of schema S that represents the content of the data source at a previous point in time, change data refers to a set of datasets $\Delta D, \nabla D, \boxplus D, \boxminus D$ where $\Delta D \subseteq D^{new}, \nabla D \subseteq D^{old}, \boxplus D \subseteq D^{new}$, and $\boxminus D \subseteq D^{old}$, and where:

$\Delta D$ denotes tuples that have been inserted in the data source;

$\nabla D$ denotes tuples that have been deleted from the data source;

$\boxplus D$ denotes the current state of tuples that have been updated in the data source (referred to herein as "update new"); and $\boxminus D$ denotes the initial state of tuples that have been updated (referred to herein as "update old");

such that the following conditions hold:

$$D^{new} = D^{old} \uplus \Delta D \uplus \boxplus D \ominus \nabla D \ominus \boxminus D$$

$$D^{old} = D^{new} \ominus \Delta D \ominus \boxplus D \uplus \nabla D \uplus \boxminus D$$

$$|\boxplus D| = |\boxminus D|$$

That is, each record in $D^{new}$ occurs at most once in either $\Delta D$ or $\boxplus D$. Similarly, each record in $D^{old}$ occurs at most once in either $\nabla D$ or $\boxminus D$. In other words, change data defines at most one modification operation per record in the data source. Such allows change data to be applied in any order (i.e., precluding updates from being lost from applying change data in an incorrect order).

An incremental load may include detecting, propagating, and applying change data to the data stored in the data warehouse. Numerous data integration techniques may be used to detect, propagate, and apply change data. However, data integration techniques may differ in their ability to detect change data. For example, a technique for detecting change data may be unable to detect record deletions. Another technique for detecting change data may be unable to distinguish between an inserted record and an updated record. In such cases, the technique for detecting change data merely detects a subset of the change data (referred to herein as "partial change data"). Further, different techniques for applying change data may impose different requirements on detected change data. For example, one technique for applying change data may require only partial change data (e.g., excluding deletions). Another technique for applying change data may require complete change data (e.g., including deletions).

While embodiments herein are described with reference to generating, from an instance of the abstract ETL operator model, an ETL job for incrementally loading data, embodiments of the invention may be adapted to support generating, from abstract operator models for transforming data generally, processes for propagating capture data generally (also known as change data propagation (CDP) processes).

In one embodiment, the application 150 may generate, from an instance 154 of the abstract ETL operator model 152, an ETL job 160 for exhaustively loading data. However, the instance 154 of the abstract ETL operator model 152 is inadequate for generating an ETL job 162 for incrementally loading data. Specifically, the operators of the abstract ETL operator model 152 capture semantics of exhaustively (rather than incrementally) transforming data. The instance 158 of the extended ETL operator model 156 represents a CDP process. The CDP process may endure restrictions imposed by the technique by which change data is captured. For example, data integration tools may be configured to ignore certain types of changes in an operational data stores identified during the ETL job, thereby improving performance. For instance, data warehouses typically retain data despite corresponding data being deleted in operational data stores. The CDP process may also satisfy any requirements imposed by techniques for applying change data.

In one embodiment, the application 150 may extend the abstract ETL operator model 152 with incremental variants 212 of operators of the abstract ETL operator model 152, to create an extended ETL operator model 156. The incremental variants 212 may accept change data, instead of datasets, as input. Further, the incremental variants 212 output change data, and are hence inter-connectable with each other. Specifically, the application 150 may replace operators of the instance 154 of the abstract ETL operator model 152 with incremental variants 212 of the operators. For example, each incremental variant 212 of the extended ETL operator model 156 may be defined as a composition of operators of the abstract ETL operator model 152. Thus, a data integration tool for translating schema mappings to instances 154 of the abstract ETL operator model 152 may also translate schema mappings to instances 158 of the extended ETL operator model 156. Further, a data integration tool for deploying exhaustive ETL jobs 160 from the instances 154 of the abstract ETL operator model 152 may also deploy incremental ETL jobs 162 from the instances 158 of the extended ETL operator model 156. In one embodiment, the application 150 may be configured to translate schema mappings to instances 154 of the abstract ETL operator model 152 as well as deploy exhaustive ETL jobs 160 from the instances 154 of the abstract ETL operator model 152.

Referring again to FIG. 7, the application 150 may replace each operator of the instance 154 of the abstract ETL operator model 152 with an incremental variant. Further, the application 150 may replace the operators in a direction from the source schema to the target schema in the instance 154 of the abstract ETL operator model 152. For example, the application 150 may replace the PROJECT operator 208 with an incremental variant before replacing the FILTER operator 206 with an incremental variant, and so forth. During an incremental load, the application 150 may propagate change data from the source schema to the target schema, according to one embodiment. That is, the application 150 may convert the change data to conform to the target schema.

Assume, in conjunction with FIG. 7, that the technique for capturing change data imposes the following limitations on techniques for propagating change data (for incrementally loading data from one or more operational data stores to a data warehouse, for example). Specifically, suppose the change data does not distinguish between inserts and updates at the source schema. For example, the change data does not include data sufficient for a CDP (change data propagation) application to determine whether a change is an insert or an update. Further, suppose that the change data does not capture deletions at the source schema.

In one embodiment, the PROJECT operator 208 may drop a column, add a column, rename a column, cast a type a column, assign values to a column, and convert values of a column. The application 150 may replace the PROJECT operator 208 with an incremental variant 212 of the PROJECT operator 208, namely, the PROJECT' operator 218. FIG. 8A illustrates an example 802 of the PROJECT' operator 218 of FIG. 2, composed from the operators 202 of the abstract ETL operator model 152, according to one embodiment of the invention. As shown, the application 150 defines the PROJECT' operator 218 from multiple PROJECT operators 208. The multiple PROJECT operators 208 process each type of change data separately. Types of change data include an insert ($\Delta A$), a delete ($\nabla A$), an update new ($\boxplus A$), an update old ($\boxminus A$), etc. For example, the PROJECT operator 208 in the example described in conjunction with FIG. 7 may drop several columns and converts abbreviated values to self-explanatory terms. Because only partial change data is available in the scenario described in conjunction with FIG. 7, the incremental variant of the PROJECT operator may omit operators dedicated to detecting unavailable change data. FIG. 8B illustrates an example 852 of such an incremental variant, according to one embodiment of the invention. As shown, the incremental variant of the PROJECT operator omits operators for processing inserts ($\Delta A$) and deletes ($\nabla A$).

Figure 9A:
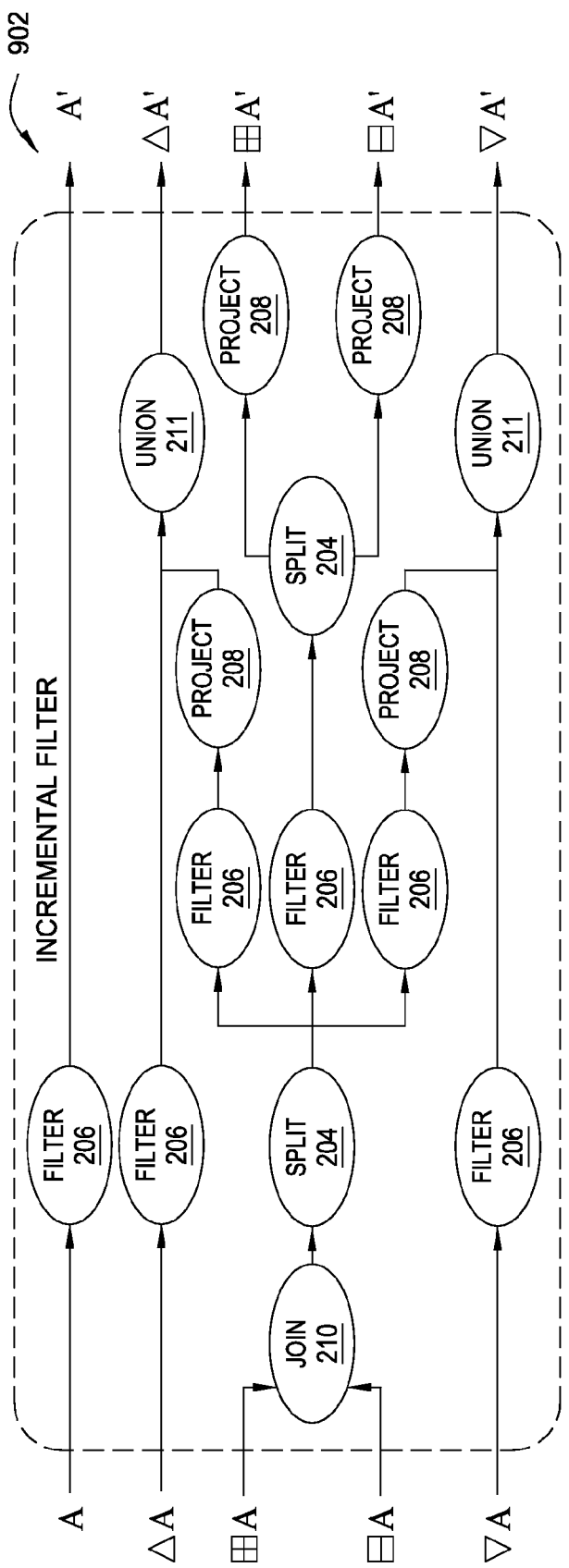
FIG. 9A-9B illustrate incremental FILTER operators composed from the operators of the abstract ETL operator model, according to one embodiment of the invention.

The FILTER operator 206 selects records from a dataset that satisfy a predicate, discarding records that fail to satisfy the predicate. In one embodiment, the application 150 may replace the FILTER operator 206 with an incremental variant 212 of the FILTER operator 206, namely, the FILTER' operator 216. FIG. 9A illustrates an example 902 of the FILTER' operator 216 of FIG. 2, composed from the operators 202 of the abstract ETL operator model 152, according to one embodiment of the invention. As shown, the application 150 defines the FILTER' operator 216 from operators including JOIN 210, FILTER 206, SPLIT 204, PROJECT 208, and UNION 211. Specifically, inserts ($\Delta A$) satisfying the predicate are propagated (i.e., loaded to the data warehouse), while inserts failing to satisfy the predicate are dropped. Similarly, deletions ($\nabla A$) satisfying the predicate are propagated, while deletions failing to satisfy the predicate are dropped. Further, an update pair ($\boxplus A$ and $\boxminus A$, i.e., both the initial value and the current value of an updated record) is propagated if both values of the update pair satisfy the filter predicate. If neither value of the update pair satisfies the filter predicate, the update pair is dropped. If only the current value ($\boxplus A$) satisfies the predicate, the update is propagated (by the UNION operator 211 for $\Delta A$) as an insert. If only the initial value ($\boxminus A$) satisfies the predicate, the update is propagated (by the UNION operator 211 for $\nabla A$) as a delete. While the complexity of the FILTER' operator may increase processing overhead, the volume of changed data is typically small compared to the total volume of data in the source schema. Thus, performing slightly more complex operations on a much smaller volume data may nevertheless result in a net performance gain (by virtue of not having to process the total volume of data).

Figure 9B:
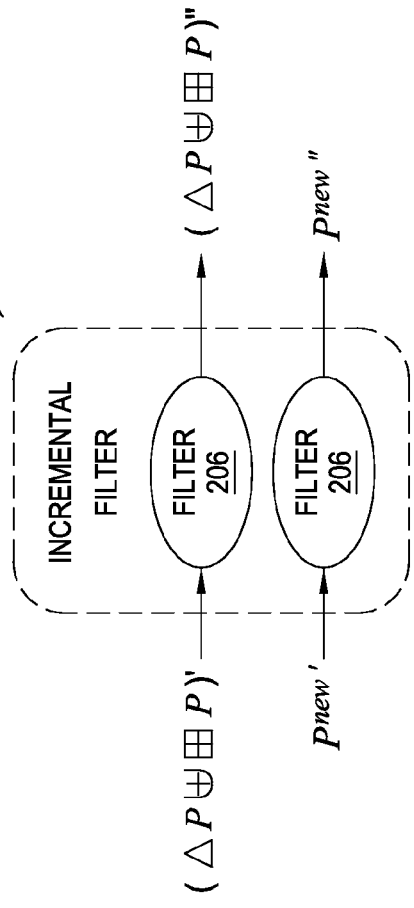

Further, because only partial change data is available in the scenario of FIG. 7, the incremental variant of the FILTER operator may omit operators for detecting unavailable change data. For example, if initial values of update records are not available, the FILTER' operator may be unable to conclude whether the update is to be propagated as an insert or an update. Thus, the FILTER' operator may also output change data that does not distinguish between inserts and updates. FIG. 9B illustrates an example 952 of such a FILTER' operator, according to one embodiment of the invention. As shown, the FILTER' operator receives partial change data that does not distinguish between inserts and updates. The FILTER' operator checks each record against the predicate, propagating only records satisfying the predicate.

In one embodiment, the JOIN operator 210 models n-way inner equi-joins, left outer equi-joins, full outer equi-joins, and cross joins. As is known, an equi-join refers to a specific type of comparator-based join that uses only equality comparisons in the join-predicate. Using other comparison operators (such as greater-than, ">") disqualifies a join as an equi-join. Further, a cross join returns the cartesian product of the sets of records from two joined tables. Thus, the cross join is identical to an inner join where the join-condition is absent from the statement (or where the join-condition always evaluates to true).

Suppose an instance 154 of the abstract ETL operator model 152 uses a JOIN operator 210 to relate information for a product (from the PRODUCT table) with packing details for the product (from the PACKAGING table). If a record in the PACKAGING table is updated, the exact change to be propagated to the target schema depends on changes to corresponding records in the PRODUCT table. For example the application 150 propagates an update for each unmodified record in the PRODUCT table that references the updated record in the PACKAGING table. The application 150 also propagates an update for each modified record in the PRODUCT table that references the updated record in the PACKAGING table. If no records from the PRODUCT table reference the updated record in the PACKAGING table, then updated record in the PACKAGING table does not impact (and is not propagated to) the target schema. Further, the application 150 propagates an insert for each newly inserted record in the PRODUCT table that references the updated record in the PACKAGING table. The application 150 also propagates a delete for each deleted record in the PRODUCT table that references the updated record in the PACKAGING table.

Figure 10:
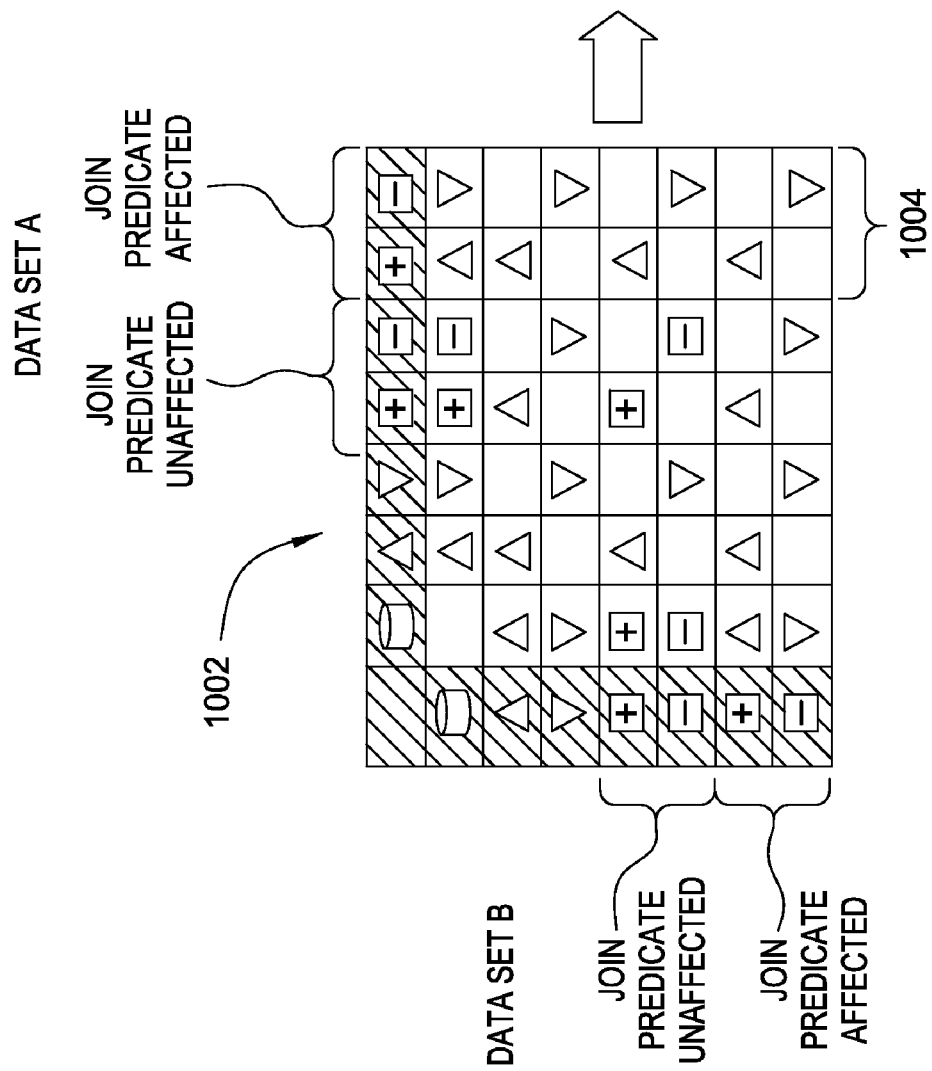
FIG. 10 depicts a matrix that represents how two inputs of change data from the source schema relate to an output of propagated change data for the target schema, according to one embodiment of the invention.

FIG. 10 depicts a matrix 1002 that represents how two inputs of change data from the source schema relate to change data propagated to the target schema, according to one embodiment of the invention. That is, matrix 1002 shows how the application 150 propagates each type of change data (e.g., a tuple representing an insert ($\Delta A$), a delete ($\nabla A$), etc.) which may be generated during the incremental ETL process. The column headers of the matrix 1002 correspond to a first data set, A, while the row headers of the matrix 1002 correspond to a second data set, B. From left to right, the column headers of the matrix 1002 represent, respectively: the unmodified subset of source data ($A^{unchanged} = A^{new} \ominus \Delta A \ominus \boxplus A$), insertions ($\Delta A$), deletions ($\nabla A$), current state of updated records ($\boxplus A$) affecting the join predicate, initial state of updated records ($\boxminus A$) affecting the join predicate, current state of updated records ($\boxplus A$) not affecting the join predicate, initial state of updated records ($\boxminus A$) not affecting the join predicate.

Similarly, from top to bottom, the row headers of the matrix 1002 represent, respectively: the unmodified subset of source data ($B^{unchanged} = B^{new} \ominus \Delta B \ominus \boxplus B$), insertions ($\Delta B$), deletions ($\nabla B$), current state of updated records ($\boxplus B$) affecting the join predicate, initial state of updated records ($\boxminus B$) affecting the join predicate, current state of updated records ($\boxplus B$) not affecting the join predicate, initial state of updated records ($\boxminus B$) not affecting the join predicate.

An intersection (denoted as ⋈) of a row and a column of the matrix 1002 is referred to herein as a cell. Further, a cell may be labeled with a type of change data (i.e., an insert, a delete, etc). For example, the cell ΔA ⋈ ΔB is part of an insert dataset ΔR of the resulting change data. Other cells labeled as insertions also contribute to ΔR. Each of the cells represents a join between the datasets A and B. ΔR is the additive union of results from all of the joins. ∇R, ⊞R, and ⊟R may be similarly computed.

Figure 11:
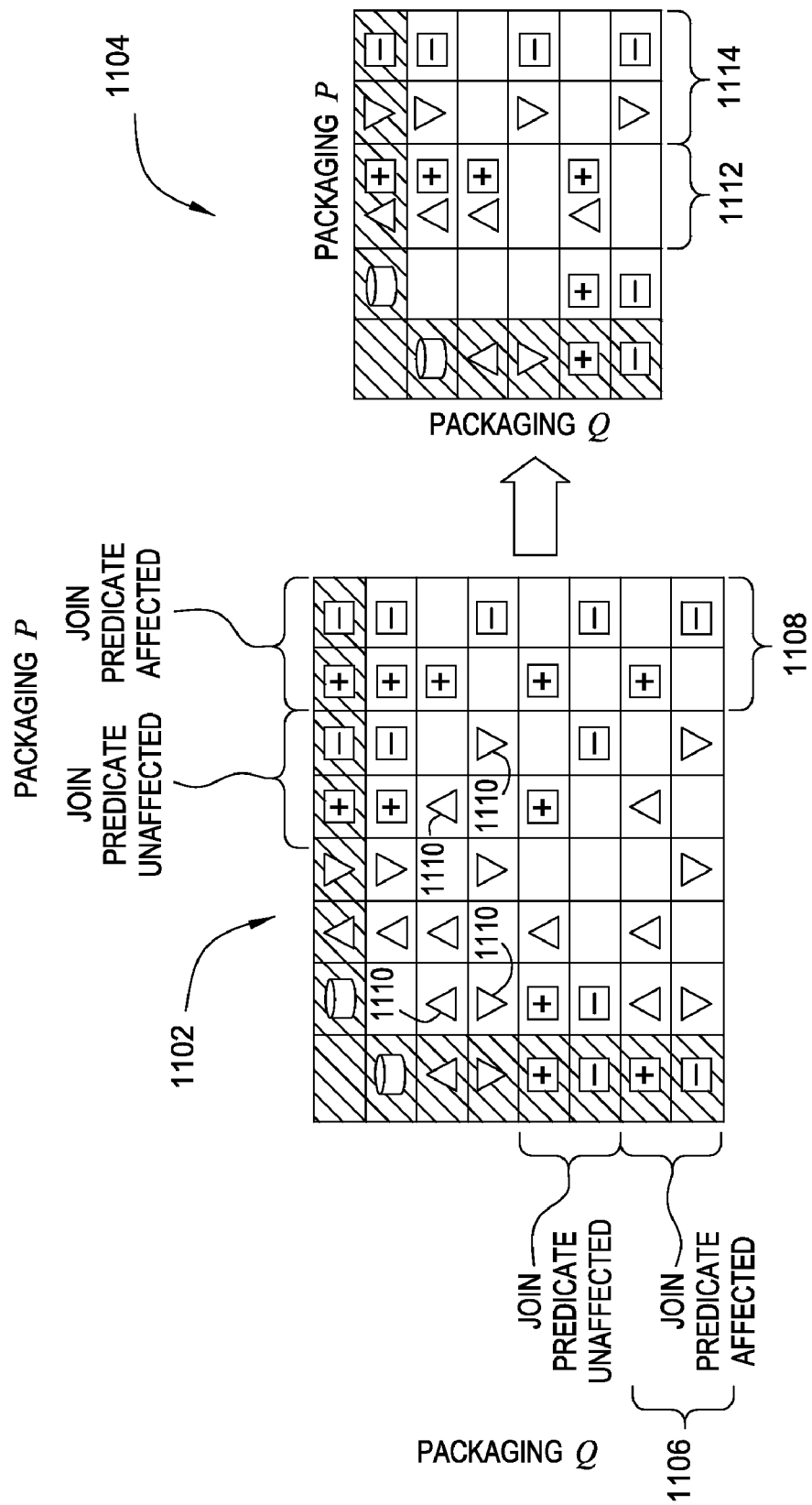
FIG. 11 illustrates simplifying a matrix based on properties of source data, according to one embodiment of the invention.

In one embodiment, if change data of a specific type is unavailable, the application 150 may be unable to evaluate cells in the matrix 1002 corresponding to the specific type. For example, if ⊟B (updated records) are unavailable, the application 150 may be unable to determine ∇R and ⊟R, according to the matrix 1002. Further, the application 150 may simplify the matrix 1002 based on properties of the source data (i.e., foreknowledge of what the source data is or is not to contain). For example, append-only datasets do not allow updating or deleting data. Thus, if A and B are append-only datasets, the application 150 may eliminate columns and rows representing deletions and updates. As another example, primary keys are unique and are typically not modified. Thus, if a primary key acts as a join key, the join predicate is not affected by any update in the data sources. That is, the application 150 may eliminate rows from the matrix corresponding to the join predicate being affected by an update in the data sources. For example, FIG. 11 illustrates simplifying a matrix 1102 based on properties of the source data, according to one embodiment of the invention. Product P, Packaging Q, and Product Dimension D (i.e., cells) of FIG. 11 correspond to dataset A, dataset B, and output dataset C (i.e., cells) of FIG. 10, respectively. As shown, the application 150 may eliminate the rows 1106 from the matrix 1102 (corresponding to the join predicate being affected).

In one embodiment, a unique column serving as a join key produces a join result having functionally dependent records. For example, in the product dimension of the target schema, packing details may be functionally dependent on stock-keeping unit (SKU) number of a product. Changing the foreign key column that references the packing of a product results in an update in the product dimension, because at most one new join partner is found (due to the packaging key being unique). From the functional dependencies in such a case, the application 150 may replace insert and delete labels of cells in the two rightmost columns of the matrix 1002 with update new and update old labels, respectively. For example, the application 150 may replace the labels of the cells 1004 of FIG. 10 with the labels of the cells 1108 of FIG. 11.

If the datasets reside in database systems, the database systems typically enforce referential integrity. In such a case, the application 150 may simplify the matrix 1002. For example, if referential integrity is enforced, a product record may not reference a nonexistent packaging record. Thus, deleting a packaging record does not result in a product record with a "dangling" reference to the packaging record. Typically, database systems enforce referential integrity by: (i) prohibiting deleting the packing record or (ii) deleting dependent records of the deleted record. Consequently, inserting a packaging record does not result in a new join partner for a product record. Similarly, deleting a packaging record does not result in a join partner being lost for a product record. Thus, the application 150 may remove labels for corresponding cells 1110 in the matrix 1102 of FIG. 11.

FIG. 11 also illustrates a simplified matrix 1104 resulting from removing labels 1106, 1108, and 1110 as described in the preceding paragraphs. As shown, the simplified matrix 1104 also includes merged insert and update columns 1112 (i.e., Δ⊞). The application 150 may merge the insert and update columns because inner joins are distributive over an additive union. That is, A⋈(B⊍C)=(A⋈B)⊍(A⋈C). Thus, a subsequent incremental operator or technique for applying change data may process the inserts and updates jointly.

Figure 12:
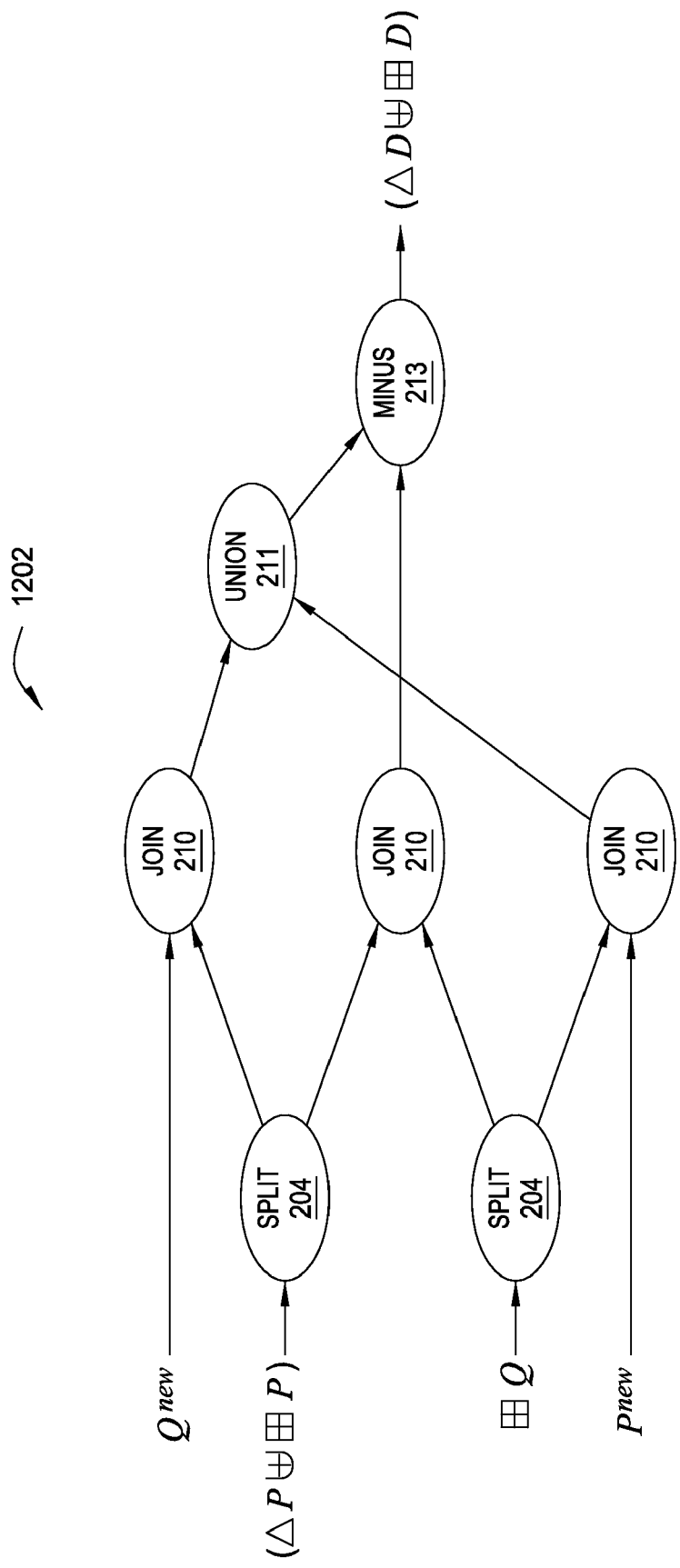
FIG. 12 illustrates an incremental JOIN operator defined from the matrix, according to one embodiment of the invention.

In one embodiment, the application 150 may define an incremental variant 212 of the JOIN operator 210 (namely, the JOIN' operator 220) based on a matrix that represents how two inputs of change data from the source schema relate to an output of propagated change data for the target schema. FIG. 12 illustrates an example 1202 of a JOIN' operator 220 defined from the matrix 1104 of FIG. 11, according to one embodiment of the invention. As shown, the application 150 composes the JOIN' operator 220 from operators including SPLIT 204, JOIN 210, UNION 211, and MINUS 213. In the scenario described above, the change data excludes deletions and initial states of updated records. This is reflected in the columns 1114 of the matrix 1104 of FIG. 11. As shown in FIG. 11, the columns include ∇D and ⊟D. In other words, the application 150 may be unable to determine ∇D and ⊟D. Further, the application 150 may be unable to distinguish inserts from updates in the resulting dataset. To compute (ΔD ⊍ ⊞D), the application 150 considers all cells with one or both of an insert label and an update label. The following equation results:

$$(\Delta D \uplus \boxplus D) = [Q^{unchanged} \bowtie (\Delta P \uplus \boxplus P)] \uplus {}_{1} [\Delta Q \bowtie $$
$$(\Delta P \uplus \boxplus P)] \uplus {}_{1} [\boxplus Q \bowtie P^{unchanged}] \uplus {}_{1} \boxplus Q \bowtie $$
$$(\Delta P \uplus \boxplus P)]$$

Because the available input values are Pnew, Qnew, (ΔP ⊍ ⊞P), ΔQ, ∇Q, ⊞Q, and ⊟Q, the application 150 may be unable to evaluate the above equation directly. However, the application 150 may rewrite the above equation as follows:

$$(\Delta D \uplus \boxplus D) = [(\Delta P \uplus \boxplus P) \bowtie Q^{new}] \uplus ,$$
$$[P^{new} \bowtie \boxplus Q] \ominus [(\Delta P \uplus \boxplus P) \bowtie \boxplus Q]$$

The application 150 may generate the incremental variant 212 of the JOIN' operator 210 directly from the rewritten equation. For example, the application 150 may generate the incremental variant 212 shown in FIG. 12. For instance, the application 150 may express the joins, the additive union, and the bag difference in terms of corresponding operators (namely, JOIN 210, UNION 211, and MINUS 213) from the abstract ETL operator model 152. As shown in FIG. 12, the application 150 may also include the SPLIT operator 204 to output multiple copies of input data.

Figure 13:
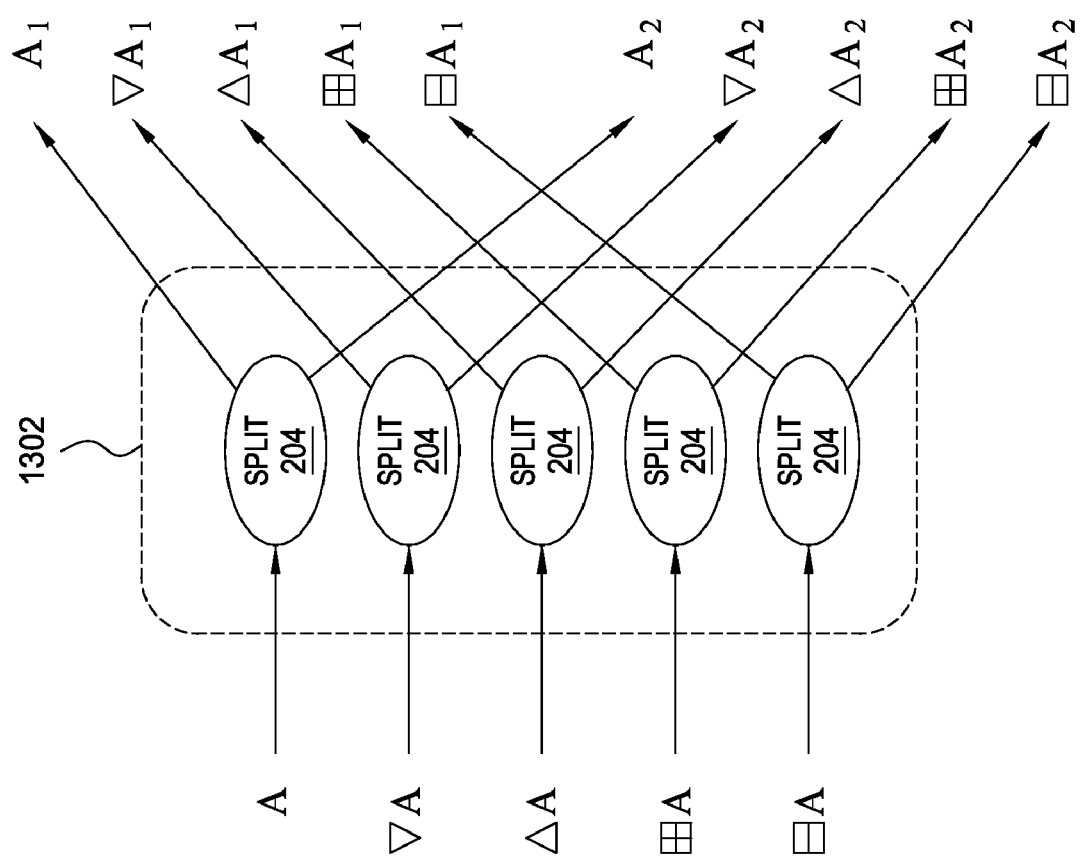
FIG. 13 illustrates an incremental SPLIT operator composed from the operators of the abstract ETL operator model, according to one embodiment of the invention.

As described above, the SPLIT operator 204 receives data and outputs multiple copies of the data, according to one embodiment. That is, the SPLIT operator 204 branches a data flow without transforming any data. The application 150 may replace the SPLIT operator 204 with an incremental variant 212 of the SPLIT operator 204, namely, the SPLIT' operator 214. FIG. 13 illustrates an example 1302 of the SPLIT' operator 214 of FIG. 2, composed from the operators 202 of the abstract ETL operator model 152, according to one embodiment of the invention. As shown, the application 150 defines the SPLIT' operator 214 from multiple SPLIT operators 204. Specifically, the SPLIT' operator 214 includes a SPLIT operator 204 for each type of change data (e.g., insert (ΔA), a delete (∇A), etc.).

Figure 14:
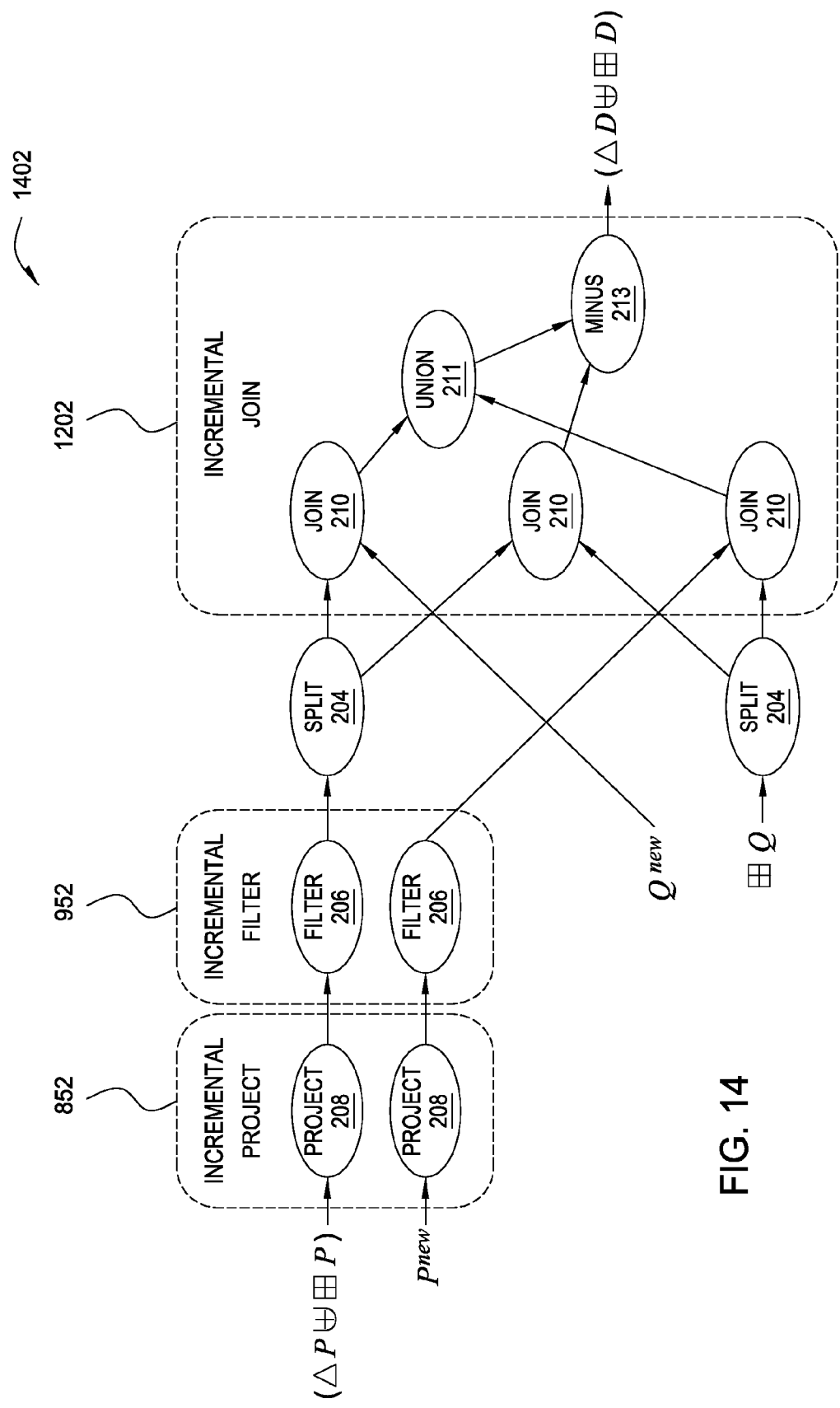
FIG. 14 illustrates an instance of the extended ETL operator model, according to one embodiment of the invention.

Referring again to FIG. 7, the application 150 may replace each operator in the instance 154 of the abstract ETL operator model 152 with an incremental variant of the respective operator to produce a corresponding instance 158 of the extended ETL operator model 158. FIG. 14 illustrates an example 1402 of an instance 158 of the extended ETL operator model 158 corresponding to the instance 154 of the abstract ETL operator model 152, according to one embodiment of the invention. As shown, the example 1402 of the corresponding instance 158 includes, in lieu of the PROJECT operator 208, an incremental variant 852 of the PROJECT operator 208. Similarly, the corresponding instance 158 includes, in lieu of the FILTER operator 206, an incremental variant 952 of the FILTER operator 206. Further, the corresponding instance 158 includes, in lieu of the JOIN operator 210, an incremental variant 1202 of the JOIN operator 210. The application 150 composes each incremental variant 852, 952, 1202 from operators 202 of the abstract ETL operator model 152. Consequently, a data integration tool (for generating exhaustive ETL jobs 160 from instances 154 of the abstract ETL operator model) may generate an incremental ETL job 162 from the instance 158 of the extended ETL operator model 156. Further, generating the corresponding instance 158 may also reveal requirements for applying change data (which are inferred from limitations of the technique for capturing change data).

Figure 15:
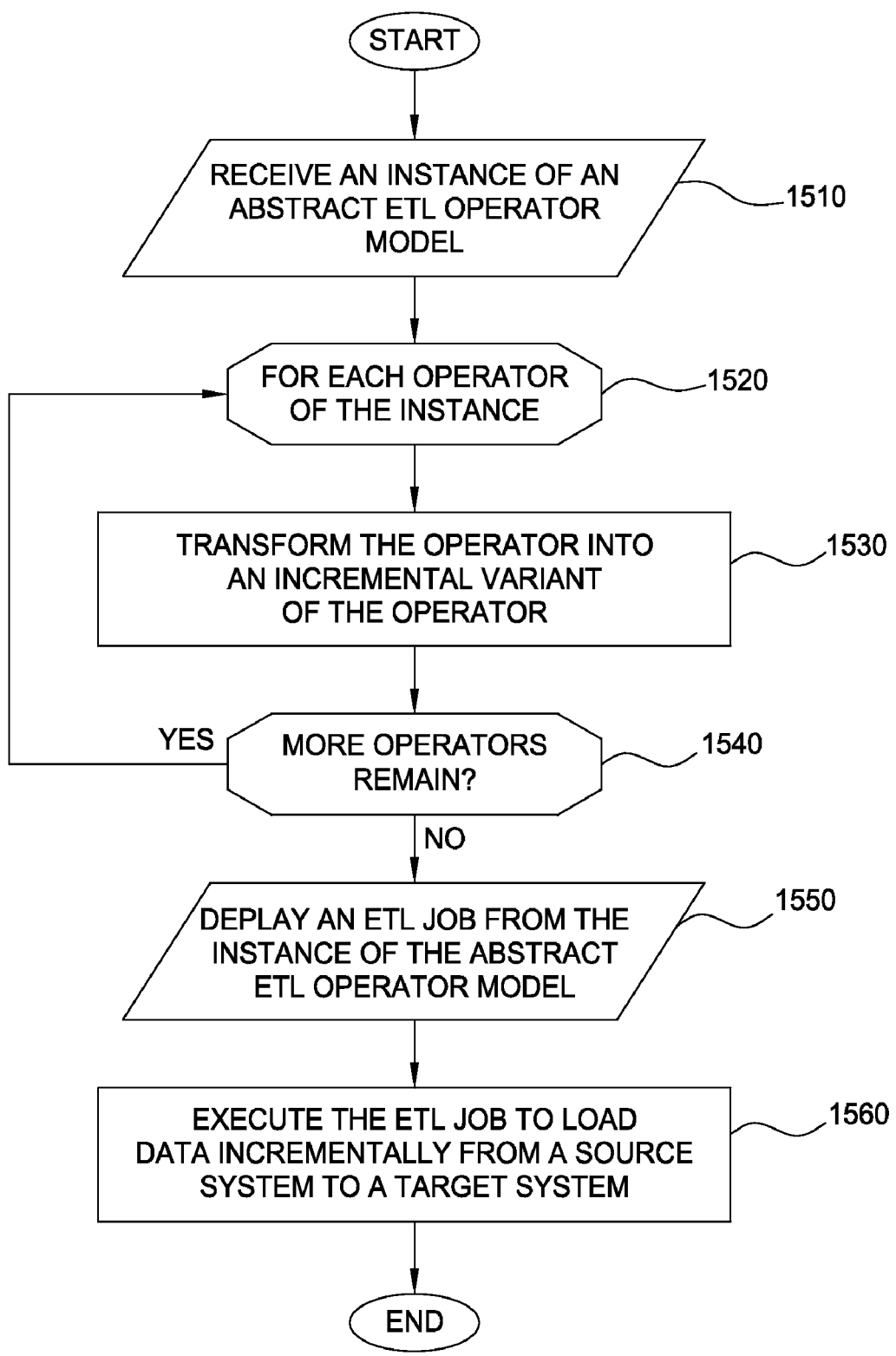
FIG. 15 is a flowchart depicting a method for generating an incremental ETL job from the instance of the abstract ETL operator model, according to one embodiment of the invention.

FIG. 15 is a flowchart depicting a method 1500 for generating an incremental ETL job 162 from the instance 154 of the abstract ETL operator model 152 of FIG. 1, according to one embodiment of the invention. As shown, the method 1500 begins at step 1510, where the application 150 receives an instance of the abstract ETL operator model. FIG. 7 illustrates an example of the instance of the abstract ETL operator model. As described above, the abstract ETL operator model 152 provides a series of operations typically used to perform an exhaustive load of data from a set of operational data stores into a data warehouse. At step 1520, a loop begins. On each pass through the loop, the application transforms an operator in the instance of the abstract ETL operator model 152 into an incremental variant of that operator (step 1530). For example, the application 150 may transform the PROJECT operator 208 of FIG. 7 (which may drop a first column and convert values of a second column in this particular example) into the incremental variant 852 of FIG. 14. As noted, in this particular example, the incremental variant of the PROJECT operator may drop a first column and convert values of a second column for each type of change data captured (e.g., insert, update, etc.). If more operators remain to be transformed (step 1540), the method returns to the step 1520. Otherwise, once each operator in the instance of the abstract ETL operator model 152 has been transformed, at step 1550, the application 150 deploys an incremental ETL job from the extended ETL operator model). At step 1560, the application 150 executes the incremental ETL job to load data from a source system to a target system. After the step 1560, the method 1500 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention generate an incremental ETL job from an instance of an abstract ETL operator model representing an exhaustive ETL job for loading data from a source schema to a target schema. One embodiment of the invention provides an application for integrating data. The application may extend an abstract ETL operator model. The extended ETL operator model may include incremental variants of operators of the abstract ETL operator model, composed from the operators of the abstract ETL operator model. The application may generate, from the instance of the abstract ETL operator model and from the extended ETL operator model, a corresponding instance of the extended ETL operator model. The application may deploy an incremental ETL job from the instance of the extended ETL operator model. The application may execute the incremental ETL job to load data from the source schema to the target schema.

Data integration tools for the abstract ETL operator model translate schema mappings to instances of the abstract ETL operator model. The translation of an instance of the abstract ETL operator model to an instance of the extended ETL operator model may be performed by application 150. Because the incremental variants are composed from operators of the abstract ETL operator model, a data integration tool for the abstract ETL operator model may deploy instances of the extended ETL operator model as incremental ETL jobs. Further, using the techniques disclosed herein, the data integration tool may generate an incremental ETL job from an exhaustive ETL job (via first generating an instance of the abstract ETL operator model from the exhaustive ETL job). Further still, the data integration tool may generate both an exhaustive ETL job and an incremental ETL job from a single schema mapping. Thus, incremental ETL jobs may be generated more efficiently and economically than those manually created by an ETL programmer. Generating incremental ETL jobs using the techniques disclosed herein may also apply ETL logic from the exhaustive ETL job to the incremental ETL job more consistently than would manually creating the incremental ETL job.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
 receiving an abstract extract, transform, and load (ETL) operator model that specifies a plurality of operations for extracting, transforming, and loading data stored in one or more source systems into storage by a target system;
 receiving a first instance of an abstract ETL operator model, wherein the first instance of the abstract ETL operator model represents a first ETL job for loading data exhaustively from the one or more source systems to the target system;
 generating, from the first instance, a second instance of an extended abstract ETL operator model, wherein the second instance of the extended abstract ETL operator model represents a second ETL job, wherein the second ETL job, when executed on a computer processor, performs an incremental extract, transform, and load of data retrieved from the source systems for storage by the target system;

receiving instructions for transforming instances of the abstract ETL operator model into an ETL job in an ETL layer;

generating the first ETL job from the first instance of the abstract ETL operator model;

generating, by operation of one or more computer processors, the second ETL job from the second instance of the extended abstract ETL operator model, wherein generating the second ETL job comprises:

transforming one or more operators in the first instance of the abstract ETL operator model into an incremental variant of the respective operator, wherein the incremental variant is specified as a composition of operators of the abstract ETL operator model, and replacing each operator with the incremental variant of the respective operator.

2. The computer-implemented method of claim 1, wherein the first ETL job, when executed on the computer processor, performs an exhaustive extract, transform, and load of data retrieved from the source systems for storage by the target system, wherein the second ETL job performs the incremental extract, transform, and load of data retrieved from the source systems for storage by the target system.

3. The computer-implemented method of claim 1, further comprising:

executing the first ETL job to perform the exhaustive extract, transform, and load of data retrieved from the one or more source systems for storage by the target system; and executing the second ETL job to perform the incremental extract, transform, and load of data retrieved from the one or more source systems for storage by the target system.

4. The computer-implemented method of claim 1, wherein each of the one or more source systems is an operational data store and wherein the target system is one of a data warehouse and a master data management system.

5. The computer-implemented method of claim 1, wherein performing the incremental extract, transform, and load of data retrieved from the one or more source systems for storage by the target system, comprises loading data changed in the one or more source systems following the execution of the instance of the first ETL job.

6. The computer-implemented method of claim 5, wherein the incremental variant of each respective operator is selected from at least one of a split operator, a filter operator, a project operator, and a join operator, wherein the instance of the abstract ETL operator model is generated from a schema mapping, and wherein loading data in a correspondent manner comprises loading data according to a single schema mapping.

7. A computer program product, comprising:

a computer-readable storage device having computer-readable program code embodied therewith, the computer-readable program code comprising:

computer-readable program code configured to receive an abstract extract, transform, and load (ETL) operator model that specifies a plurality of operations for extracting, transforming, and loading data stored in one or more source systems into storage by a target system;

computer-readable program code configured to receive a first instance of an abstract ETL operator model, wherein the first instance of the abstract ETL operator model represents a first ETL job for loading data exhaustively from the one or more source systems to the target system;

computer-readable program code configured to generate, from the first instance, a second instance of an extended abstract ETL operator model, wherein the second instance of the extended abstract ETL operator model represents a second ETL job, wherein the second ETL job, when executed on a computer processor, performs an incremental extract, transform, and load of data retrieved from the source systems for storage by the target system;

computer-readable program code configured to receive instructions for transforming instances of the abstract ETL operator model into an ETL job in an ETL layer;

computer-readable program code configured to generate the first ETL job from the first instance of the abstract ETL operator model;

computer-readable program code configured to generate the second ETL job from the second instance of the extended abstract ETL operator model, wherein generating the second ETL job comprises:

transforming one or more operators in the first instance of the abstract ETL operator model into an incremental variant of the respective operator, wherein the incremental variant is specified as a composition of operators of the abstract ETL operator model; and replacing each operator with the incremental variant of the respective operator.

8. The computer-program product of claim 7, wherein the first ETL job, when executed on the processor, performs an exhaustive extract, transform, and load of data retrieved from the source systems for storage by the target system, wherein the second ETL job performs the incremental extract, transform, and load of data retrieved from the source systems for storage by the target system.

9. The computer-program product of claim 7, further comprising:

executing the first ETL job to perform the exhaustive extract, transform, and load of data retrieved from the one or more source systems for storage by the target system; and executing the second ETL job to perform the incremental extract, transform, and load of data retrieved from the one or more source systems for storage by the target system.

10. The computer-program product of claim 7, wherein each of the one or more source systems is an operational data store and wherein the target system is one of a data warehouse and a master data management system.

11. The computer-program product of claim 7, wherein performing the incremental extract, transform, and load of data retrieved from the one or more source systems for storage by the target system, comprises loading data changed in the one or more source systems following the execution of the instance of the first ETL job.

12. The computer-program product of claim 7, wherein the incremental variant of each respective operator is selected from at least one of a split operator, a filter operator, a project operator, and a join operator, wherein the instance of the abstract ETL operator model is generated from a schema mapping, and wherein loading data in a correspondent manner comprises loading data according to a single schema mapping.

13. A system, comprising:

one or more computer processors; and a memory containing a program, which when executed by the processor is configured to perform an operation comprising:

receiving an abstract extract, transform, and load (ETL) operator model that specifies a plurality of operations for extracting, transforming, and loading data stored in one or more source systems into storage by a target system;

receiving a first instance of an abstract ETL operator model, wherein the first instance of the abstract ETL operator model represents a first ETL job for loading data exhaustively from the one or more source systems to the target system;

generating, from the first instance, a second instance of an extended abstract ETL operator model, wherein the second instance of the extended abstract ETL operator model represents a second ETL job, wherein the second ETL job, when executed on a computer processor, performs an incremental extract, transform, and load of data retrieved from the source systems for storage by the target system;

receiving instructions for transforming instances of the abstract ETL operator model into an ETL job in an ETL layer;

generating the first ETL job from the first instance of the abstract ETL operator model;

generating the second ETL job from the second instance of the extended abstract ETL operator model, wherein generating the second ETL job comprises:

transforming one or more operators in the first instance of the abstract ETL operator model into an incremental variant of the respective operator, wherein the incremental variant is specified as a composition of operators of the abstract ETL operator model, and replacing each operator with the incremental variant of the respective operator.

14. The system of claim 13, wherein the first ETL job, when executed on the computer processors, performs an exhaustive extract, transform, and load of data retrieved from the source systems for storage by the target system, wherein the incremental extract, transform, and load of data retrieved from the source systems for storage by the target system.

15. The system of claim 13, further comprising:

executing the first ETL job to perform the exhaustive extract, transform, and load of data retrieved from the one or more source systems for storage by the target system; and executing the second ETL job to perform the incremental extract, transform, and load of data retrieved from the one or more source systems for storage by the target system.

16. The system of claim 13, wherein each of the one or more source systems is an operational data store and wherein the target system is one of a data warehouse and a master data management system.

17. The system of claim 13, wherein performing the incremental extract, transform, and load of data retrieved from the one or more source systems for storage by the target system, comprises loading data changed in the one or more source systems following the execution of the instance of the first ETL job.

18. The system of claim 13, wherein the incremental variant of each respective operator is selected from at least one of a split operator, a filter operator, a project operator, and a join operator, wherein the instance of the abstract ETL operator model is generated from a schema mapping, and wherein loading data in a correspondent manner comprises loading data according to a single schema mapping.

* * * * *